(12) United States Patent
Park et al.

(10) Patent No.: US 10,880,907 B2
(45) Date of Patent: Dec. 29, 2020

(54) IN-DEVICE COEXISTENCE INTERFERENCE AVOIDANCE (IDC)

(75) Inventors: Kenneth J. Park, Cathlamet, WA (US); Shohei Yamada, Camas, WA (US); John M. Kowalski, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 1167 days.

(21) Appl. No.: 13/289,940

(22) Filed: Nov. 4, 2011

(65) Prior Publication Data

US 2013/0114583 A1   May 9, 2013

(51) Int. Cl.
*H04W 72/12*      (2009.01)
*H04W 52/02*      (2009.01)
*H04W 88/06*      (2009.01)

(52) U.S. Cl.
CPC ... *H04W 72/1215* (2013.01); *H04W 52/0216* (2013.01); *H04W 88/06* (2013.01); *Y02D 30/70* (2020.08)

(58) Field of Classification Search
CPC ......... H04W 72/1215; H04W 52/0216; H04W 88/06; Y02B 60/50
See application file for complete search history.

(56) References Cited

U.S. PATENT DOCUMENTS

| | | | |
|---|---|---|---|
| 7,929,468 B2 | 4/2011 | Goldhamer | |
| 8,923,208 B2* | 12/2014 | Dayal et al. | 370/328 |
| 2007/0008915 A1* | 1/2007 | Kim | H04W 52/0216 370/311 |
| 2009/0092111 A1 | 4/2009 | Horn et al. | |
| 2009/0124301 A1 | 5/2009 | Raissinia | |
| 2010/0002608 A1 | 1/2010 | Goldhamer | |
| 2010/0056136 A1 | 3/2010 | Zhu | |
| 2010/0091702 A1 | 4/2010 | Luo et al. | |
| 2010/0309893 A1 | 12/2010 | Zhu et al. | |
| 2011/0237231 A1* | 9/2011 | Horneman | H04W 76/048 455/414.1 |
| 2011/0243047 A1* | 10/2011 | Dayal | H04W 16/14 370/311 |

(Continued)

FOREIGN PATENT DOCUMENTS

| | | |
|---|---|---|
| WO | 2008/058150 | 5/2008 |
| WO | 2009/136960 | 11/2009 |
| WO | 2010/141152 | 12/2010 |

OTHER PUBLICATIONS

3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.

(Continued)

*Primary Examiner* — Ajit Patel
*Assistant Examiner* — Wilfred Thomas
(74) *Attorney, Agent, or Firm* — Keating & Bennett, LLP

(57) ABSTRACT

In a method for in-device coexistence interference avoidance (IDC), an IDC assistance information message is received from a wireless communication device. The IDC assistance information message includes at least a timing offset information which is used to align the occurrence of Long Term Evolution (LTE) DRX inactivity periods with the occurrence of Industrial, Scientific, and Medial (ISM) active periods.

8 Claims, 14 Drawing Sheets

(56) References Cited

U.S. PATENT DOCUMENTS

| | | | | |
|---|---|---|---|---|
| 2011/0256834 | A1* | 10/2011 | Dayal | H04W 16/14 455/67.7 |
| 2011/0312288 | A1* | 12/2011 | Fu et al. | 455/88 |
| 2012/0020229 | A1* | 1/2012 | Dayal | H04W 16/14 370/252 |
| 2012/0020231 | A1* | 1/2012 | Chen | H04W 36/08 370/252 |
| 2012/0040620 | A1* | 2/2012 | Fu | H04B 1/1027 455/63.1 |
| 2012/0040642 | A1* | 2/2012 | Zhu | H04W 72/082 455/411 |
| 2012/0071106 | A1* | 3/2012 | Kadous et al. | 455/67.11 |
| 2012/0082140 | A1* | 4/2012 | Lin | H04W 72/1215 370/336 |
| 2012/0087341 | A1* | 4/2012 | Jang | H04W 72/1215 370/331 |
| 2012/0176923 | A1* | 7/2012 | Hsu | H04W 52/243 370/252 |
| 2012/0213162 | A1* | 8/2012 | Koo | H04W 16/14 370/329 |
| 2013/0029704 | A1* | 1/2013 | Koo | H04W 72/1215 455/501 |
| 2013/0114515 | A1* | 5/2013 | Koo | H04J 11/0023 370/329 |
| 2013/0114516 | A1* | 5/2013 | Koo | H04B 15/00 370/329 |
| 2013/0208641 | A1* | 8/2013 | Baghel | H04B 1/109 370/311 |
| 2013/0212219 | A1* | 8/2013 | Koskela et al. | 709/217 |
| 2013/0287009 | A1* | 10/2013 | Ahn | H04W 72/1289 370/336 |
| 2013/0294412 | A1* | 11/2013 | Wang | H04W 16/14 370/331 |
| 2014/0031036 | A1* | 1/2014 | Koo | H04W 36/20 455/434 |
| 2014/0120916 | A1* | 5/2014 | Du et al. | 455/436 |
| 2014/0323177 | A1* | 10/2014 | Zou et al. | 455/550.1 |
| 2014/0328240 | A1* | 11/2014 | Munari et al. | 370/311 |

OTHER PUBLICATIONS

3GPP TS 36.331 V9.1.0, "Evolved Universal Terrestrial Radio Access (E-UTRA) Radio Resource Control (RRC); Protocol specification (Release 9)," Dec. 2009.

3GPP TS 36.321 V9.1.0, "Evolved Universal Terrestrial Radio Access (E-UTRA) Medium Access Control (MAC) protocol specification (Release 9)," Dec. 2009.

3GPP TR 36.814 V1.5.0, "Further Advancements for E-UTRA Physical Layer Aspects (Release 9)," Mar. 2009.

3GPP TS 36.214 V8.6.0, "Evolved Universal Terrestrial Radio Access (E-UTRA) Physical layer—Measurements (Release 8)," Mar. 2009.

3GPP TS 36.213 V8.6.0, "Evolved Universal Terrestrial Radio Access (E-UTRA) Physical layer procedures (Release 8)," Mar. 2009.

3GPP TS 36.212 V9.0.0, "Evolved Universal Terrestrial Radio Access (E-UTRA); Multiplexing and Channel Coding (Release 9)," Dec. 2009.

3GPP TS 36.211 V9.0.0, "Evolved Universal Terrestrial Radio Access (E-UTRA); Physical Channels and Modulation (Release 9)," Dec. 2009.

CMCC, "New Study Item Proposal: Signaling and Procedure for In-Device Coexistence Interference Avoidance," 3GPP TSG RAN #48, RP-100671, Jun. 2010.

3GPP TR 36.816 V1.0.0, "Evolved Universal Terrestrial Radio Access (EU-TRA); Study on Signaling and Procedure for Interference Avoidance for In-Device Coexistence; (Release 10)," Nov. 2010.

Pérez-Costa, Xavier, et al., "IEEE 802.11e QoS and Power Saving Features Overview and Analysis of Combined Performance," IEEE Wireless Communications, pp. 88-96, Aug. 2010.

Pérez-Costa, Xavier, et al., "Analysis of the Integration of IEE 802.11e Capabilities in Battery Limited Mobile Devices," IEEE Wireless Communications, pp. 26-32, Dec. 2005.

IEEE Computer Society, "IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications," IEEE std. 802.11, Jun. 2007.

* cited by examiner

IN-DEVICE COEXISTENCE INTERFERENCE AVOIDANCE (IDC)

TECHNICAL FIELD

The present invention relates generally to wireless communications and wireless communications-related technology. More specifically, the present invention relates to systems and methods for in-device coexistence interference avoidance (IDC).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. For example, a wireless communication device may use a Long Term Evolution (LTE) technology for wireless communication. A wireless communication device may also use additional communication technologies such as Wi-Fi and Bluetooth. A wireless communication device using multiple communication technologies may use a different transceiver for each communication technology.

As wireless communication devices become more complex, more and more wireless technologies on the wireless communication device may be used simultaneously on the wireless communication device. For example, a wireless communication device may communicate using Long Term Evolution (LTE) protocols while simultaneously communicating using a Wi-Fi protocol. Such dual communications may introduce interference. Benefits may be realized by improvements to the use of multiple wireless technologies simultaneously on a wireless communication device.

DETAILED DESCRIPTION

Figure 1:
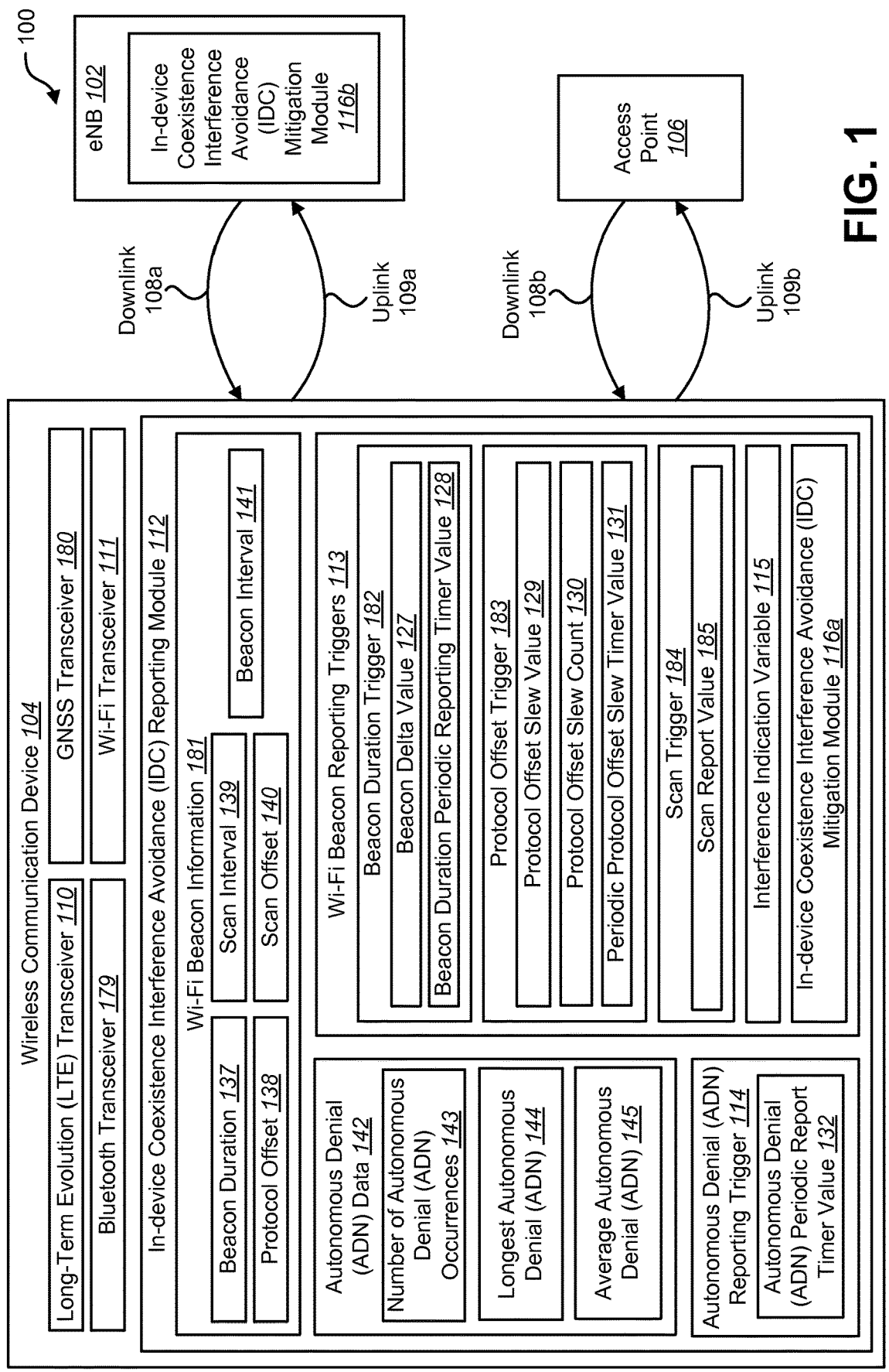
FIG. 1 is a block diagram illustrating a wireless communication system with multiple wireless devices.

A method for in-device coexistence interference avoidance (IDC) is described. An IDC assistance information message is received from a wireless communication device. Long Term Evolution (LTE) uplink inactivity periods for the wireless communication device are aligned with Wi-Fi beacon periods. An IDC configuration message is generated. The IDC configuration message is sent to the wireless communication device.

The method may be performed by an eNB. The IDC assistance information message may include at least one of a beacon duration, a beacon duration change indication, a protocol offset, a protocol offset change indication, a scan interval, a scan offset and a beacon interval. The IDC assistance information message may include autonomous denial (ADN) data. The ADN data may include one of a number of ADN occurrences, a longest ADN and an average ADN.

The IDC assistance information message may be located on a media access control (MAC) protocol data unit (PDU) that is received on an uplink shared channel. The MAC PDU may have a logical channel ID. The IDC assistance information message may be part of a radio resource control (RRC) message received on a dedicated control channel. The IDC configuration message may include an indicator to start/stop sending IDC assistance information.

The IDC configuration message may include at least one reporting trigger configuration for the wireless communication device. A reporting trigger configuration may include at least one of a beacon delta value, a beacon duration periodic reporting timer value, a protocol offset slew value, a protocol offset slew count, a periodic protocol offset slew timer value, a scan report value and an autonomous denial (ADN) periodic report timer value. The IDC assistance information message may be used to align the LTE uplink inactivity periods for the wireless communication device with the Wi-Fi beacon periods.

Aligning the LTE uplink inactivity periods for the wireless communication device with the Wi-Fi beacon periods may take into account deterministic slew of a Wi-Fi beacon. Aligning the LTE uplink inactivity periods for the wireless communication device with the Wi-Fi beacon periods may also take into account a duration of a Wi-Fi beacon.

A method for in-device coexistence interference avoidance (IDC) is also described. Interference between Long Term Evolution (LTE) and Wi-Fi is detected. IDC assistance information is obtained. An IDC assistance information message that includes the IDC assistance information is generated. The IDC assistance information message is sent to an eNB.

The method may be performed by a wireless communication device. An IDC configuration message may be received from the eNB. Parameters may be updated based on the IDC configuration message. Old reporting trigger configurations may be replaced with the at least one reporting trigger configuration received.

An apparatus configured for in-device coexistence interference avoidance (IDC) is described. The apparatus includes a processor, memory in electronic communication with the processor and instructions stored in the memory. The instructions are executable to receive an IDC assistance information message from a wireless communication device. The instructions are also executable to align Long Term Evolution (LTE) uplink inactivity periods for the wireless communication device with Wi-Fi beacon periods. The instructions are further executable to generate an IDC configuration message. The instructions are also executable to send the IDC configuration message to the wireless communication device.

An apparatus configured for in-device coexistence interference avoidance (IDC) is also described. The apparatus includes a processor, memory in electronic communication with the processor and instructions stored in the memory. The instructions are executable to detect interference between Long Term Evolution (LTE) and Wi-Fi. The instructions are also executable to obtain IDC assistance information. The instructions are further executable to generate an IDC assistance information message that comprises the IDC assistance information. The instructions are also executable to send the IDC assistance information message to an eNB.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and the Evolved Universal Terrestrial Radio Access Network (E-UTRAN).

At least some aspects of the systems and methods disclosed herein may be described in relation to the 3GPP Long Term Evolution (LTE) and Long Term Evolution (LTE)-Advanced standards (e.g., Release-8, Release-9 and Release-10). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 with multiple wireless devices. A wireless device may be a wireless communication device 104, an access point 106 or an eNB (eNode B) 102. A wireless communication device 104 may have multiple functionalities. For example, a wireless communication device 104 may be capable of communicating using both Long Term Evolution (LTE) wireless communication standards and Wi-Fi communication standards. A wireless communication device 104 that is capable of communicating using the Long Term Evolution (LTE) communication standards may be referred to as a user equipment (UE). A user equipment (UE) is the radio terminal part of the Long Term Evolution (LTE) system. A wireless communication device 104 that is capable of communicating using the Wi-Fi communication standards (i.e., that includes an IEEE 802.11 conformant media access control (MAC) and physical layer (PHY) interface to the wireless medium (WM)) may be referred to as a station (STA). As used herein, a wireless communication device 104 refers to a device with both user equipment (UE) functionality and station (STA) functionality. Thus, the user equipment (UE) and the station (STA) are collocated in the same physical device. A wireless communication device 104 may be referred to as a mobile station, a subscriber station, an access terminal, a remote station, a terminal, a handset, a subscriber unit, a user terminal, or some other terminology. A station (STA) may be of type non-AP station (referred to herein as station (STA) unless specified otherwise) or AP station (AP). An AP station (AP) may support a 1-to-many connection (i.e., an AP station (AP) may be connected to many non-AP stations (STA)) while a non-AP station (STA) supports a 1-to-1 connection (i.e., the non-AP station (STA) is connected to only one AP station (AP)).

An eNB 102 is the radio access part of a Long Term Evolution (LTE) system. An eNB 102 may be in wireless communication with one or more wireless communication devices 104. A user equipment (UE) and an eNB 102 are a logical pair. An eNB 102 may be referred to as a Node B, a base station or some other terminology. The eNB 102 may communicate with a core network.

An access point 106 or AP station (AP) is any entity that has station (STA) functionality and provides access to distribution services, via a wireless medium for associated wireless communication devices 104. An access point 106 may also be in wireless communication with one or more wireless communication devices 104. An access point 106 may also be referred to as a base station or some other terminology. An access point 106 and a station (STA) are a logical pair. While FIG. 1 refers to a non-AP station (STA) explicitly, it is understood that this behavior, and the descriptions, apply to any signaling that may be used if the transceiver device includes an AP station (AP) or a non-AP station (STA), and that the Wi-Fi uplink downlink is to a non-AP station (STA) with the appropriate Wi-Fi transmission and reception signals being changed to enable autonomous denial (ADN) of transmission and reception in the ISM band. A wireless communication device 104 may deny Long Term Evolution (LTE) transmissions (autonomous denial (ADN) for Long Term Evolution (LTE)) or deny ISM transmissions (autonomous denial (ADN) for ISM).

Communication between a wireless communication device 104 and either (or both) an eNB 102 and an access point 106 may be accomplished using transmissions over a wireless link, including an uplink 109*a-b* and a downlink 108*a-b*. The uplink 109*a-b* refers to communications sent from a wireless communication device 104 to an eNB 102 or an access point 106. The downlink 108*a-b* refers to communications sent from an eNB 102 or an access point 106 to a wireless communication device 104.

The communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, an eNB 102 may have multiple antennas, an access point 106 may have multiple antennas and a wireless communication device 104 may have multiple antennas. In this way, the eNB 102 and the wireless communication device 104 may each operate as either a transmitter or a receiver in a MIMO system. Likewise, the access point 106 and the wireless communication device 104 may each operate as either a transmitter or a receiver in a MIMO system. One benefit of a MIMO system is improved performance if the additional dimensionalities created by the multiple transmit and receive antennas are utilized.

The wireless communication device 104 communicates with an eNB 102 and an access point 106 using one or more antennas. In order to allow access to various networks and services, a wireless communication device 104 may be equipped with multiple radio transceivers and receivers.

One of the difficulties of operating multiple transceivers simultaneously in the same device at the same time using adjacent frequencies or sub-harmonic frequencies is in trying to avoid interference caused by one transceiver's transmissions onto another transceiver's receptions. For a wireless communication device 104, this is because of the close proximity of the transceivers and receivers, such that the transmit power of a transmitter may be much higher than the received power of a receiver.

The wireless communication device 104 may include a Long Term Evolution (LTE) transceiver 110. The Long Term Evolution (LTE) transceiver 110 may be used for Long Term Evolution (LTE) transmissions and receptions. In one configuration, the Long Term Evolution (LTE) transceiver 110 may be a Long Term Evolution Advanced (LTE-A) transceiver.

The wireless communication device 104 may also include a Wi-Fi transceiver 111. The Wi-Fi transceiver 111 may be used to transmit and receive Wi-Fi signals. Wi-Fi signals may be referred to as Wi-Fi or Wireless Fidelity signals. Wi-Fi is an implementation and specification of the IEEE 802.11 wireless networking standard as determined by the Wi-Fi Alliance. Wi-Fi may refer to those communications within the Industrial, Scientific and Medial (ISM) band. However, Wi-Fi may also refer to wireless communications that are outside of the ISM band. The wireless communication device 104 may further include a Bluetooth transceiver 179 and a Global Navigation Satellite Systems (GNSS) receiver 180. Multiple transceivers may use the same antenna (e.g., a Bluetooth transceiver 179 may use the same antenna as a Wi-Fi transceiver 111). Wi-Fi and Bluetooth occupy the same frequency band (the Industrial, Scientific and Medical (ISM) band) and may jointly be referred to as ISM. ISM refers to the frequency band from 2400 megahertz (MHz) to 2483.5 MHz.

IEEE 802.11 defines a power save mode (PSM) which allows wireless local area network (WLAN) devices to enter into a low power consumption state by buffering frames directed to these wireless local area network (WLAN) devices at the access point 106 while the wireless local area network (WLAN) devices are saving energy. Periodically (once every beacon interval), the access point 106 may send a beacon to the wireless communication device 104 indicating whether or not the wireless communication device 104 has any data buffered at the access point 106. The wireless communication device 104 may wakeup to listen to beacons at a fixed frequency (listen interval) and poll the access point 106 to receive the buffered data by sending Power Save Polls (PS-Polls). Whenever the access point 106 sends data to the wireless communication device 104, the access point 106 indicates whether or not there are more data frames outstanding by using the More Data (MD) bit in the data frames. A wireless communication device 104 goes back to sleep only when it has retrieved all the pending data.

The 802.11e specification includes additional optional protocols for enhanced 802.11 media access control (MAC) layer quality of service (QoS), such as automatic power save delivery (APSD). Automatic power save delivery (APSD) is a more efficient power management method than legacy 802.11 power save polling. Most newer 802.11 stations (STA) already support a power management mechanism similar to automatic power save delivery (APSD). Automatic power save delivery (APSD) is very useful for voice over IP (VOIP) phones, as the data rates are roughly the same in both directions. Whenever voice data is sent to the access point 106, the access point 106 may be triggered to send the buffered voice data in the other direction. After that, the voice over IP (VOIP) phone may enter a sleep state until the next voice data has to be sent to the access point 106.

The IEEE 802.11 standard defines two independent power-management mechanisms, depending on whether an infrastructure mode or an ad hoc mode is used, that allow wireless communication devices 104 to enter a power saving mode of operation where the receiver and transmitter are turned off to conserve power. Most wireless local area network (WLAN) deployments use the infrastructure mode with the access arbitrated by the distributed coordination function (DCF).

In the infrastructure mode, the power-management mechanism is centralized in the access point 106. Access points 106 maintain a power-management status for each currently associated station that indicates in which power-management mode the station is currently operating. Stations changing the power-management mode inform the access point 106 of this fact by using the power-management bits within the frame control field of the transmitted frames. The access point 106 buffers unicast and multicast data frames destined for any of its associated stations in power save mode (PSM). If an access point 106 has buffered frames for a station, it will indicate this in the traffic indication map (TIM), which is sent with each beacon frame. During the association process, every station is assigned an association ID code (AID) by the access point 106. The association ID code (AID) indicates with a single bit in the traffic indication map (TIM) whether frames are buffered for a specific station. Stations may request the delivery of their buffered frames at the access point 106 by sending a powersave poll (PS-Poll). A single buffered frame for a station in power save mode (PSM) is sent after a PS-Poll has been received from a station. Further PS-Poll frames from the same station are acknowledged and ignored until the frame is either successfully delivered or presumed failed due to the maximum number of retries being exceeded. This prevents a retried PS-Poll from being treated as a new request to deliver a buffered frame. Finally, access points 106 have an aging function that deletes buffered traffic when it has been buffered for an excessive period of time.

A station may be in one of two different power states: awake or doze. When awake, the station is fully powered. When in doze, the station is not able to transmit or receive and consumes very low power. While in power save mode (PSM), a station may wakeup to listen to a beacon once every n beacons, where n is an integer greater then or equal to 1. The listen interval value used by a station is communicated to the access point 106 in its association request. Each station learns through the traffic indication map (TIM) in the beacon whether the access point 106 buffered any frames destined to them while they were in the doze state. If a station sends a PS-Poll to retrieve a buffered frame, the access point 106 can respond by acknowledging it (ACK) or sending the data frame directly. In the event that neither an ACK nor a data frame is received from the access point 106 in response to a PS-Poll frame, the station retries the sequence by transmitting another PS-Poll frame. In the frame control field of the frame sent in response to a PS-Poll, the access point 106 sets a bit labeled More Data if there are further frames buffered for this station.

The station is required to send a PS-Poll to the access point 106 for each data frame it receives with the More Data bit set. This ensures that stations empty the buffer of the frames held for them at the access point 106. Mobile stations should also awake at times determined by the access point when broadcast/multicast (BC/MC) frames are to be transmitted. This time is indicated in the beacon frames as the delivery traffic indication map (DTIM) interval. If ReceiveDTIM is true, a station must wakeup at every DTIM. The PSM functionality does not imply that frames sent from the station to the access point 106 are delayed until the next beacon is received. Mobile nodes wake up whenever they have data to send and follow the regular 802.11 transmission procedure.

The In-device Coexistence Interference (IDC) (also referred to as the ICO) Avoidance is a new Study Item (SI) approved by the 3GPP RAN#48 plenary (RP-100671) and it is expected that the resulting specification will be included in Rel-11. This Study Item (SI) addresses the coexistence scenarios that Long Term Evolution (LTE)-A, Global Navigation Satellite Systems (GNSS), Bluetooth and Wi-Fi radios encounter when implemented in the same device and operating on adjacent or sub-harmonic frequencies. Wi-Fi and Bluetooth occupy the same frequency band (the ISM band from 2400 megahertz (MHz) to 2483.5 MHz). The objective of the study is to identify and investigate the suitability of methods for interference avoidance from a signaling and procedural perspective (i.e., interference detection and avoidance through scheduling of time and frequency and power resources). If procedural methods are found to be insufficient, the study may consider enhanced mechanisms (e.g., inter device communications).

When ISM transceivers (e.g., a Bluetooth transceiver 179 or a Wi-Fi transceiver 111) and a Long Term Evolution (LTE) transceiver 110 are implemented in the same wireless communication device 104, the uplink 109 transmissions from the ISM transceiver may interfere with the Long Term Evolution (LTE) downlink 108 reception by the Long Term Evolution (LTE) transceiver 110. Likewise, the Long Term Evolution (LTE) transceiver 110 uplink 109 transmissions may interfere with the ISM downlink 108 receptions (see Long Term Evolution (LTE) 3GPP 36.816)). The simplest means by which interference is mitigated between multiple transceivers operating at the same time is via a physical separation of the transmitter and receiver antennas and/or sufficient frequency separation between the transmit signal and receive signal. When frequency separation is not sufficient, filtering technologies can be applied, where the transmitting device is able to reduce and the receiving device is able to reject out-of-band spurious emissions. However, for some Long Term Evolution (LTE) usage scenarios, filter technology cannot provide sufficient rejection, because of the adjacent nature of frequency band allocations for Wi-Fi/Bluetooth and Long Term Evolution (LTE) and because a physical separation of the antennas is not practical in a wireless communication device 104.

Therefore, solving the interference problem in a wireless communication device 104 (referred to as the in-device coexistence interference avoidance (IDC) problem) may require either a time division multiplexing (TDM) solution wherein the transmitter and/or the receiver coordinate their activity in time, a frequency division multiplexing (FDM) solution whereby either the transmitter or the receiver (or both) move to another frequency, a Long Term Evolution (LTE) power control solution whereby the Long Term Evolution (LTE) transmitter reduces its output power to a point that the receiver can operate, a UE autonomous denial (UAD) solution whereby the wireless communication device 104 unilaterally aborts transmission opportunities (UAD is a special case of TDM) or by disabling the offending transmitter. It is possible that one or more of the above solutions may be applied to address the in-device coexistence interference avoidance (IDC) problem.

The wireless communication device 104 may include an in-device coexistence interference avoidance (IDC) reporting module 112. The in-device coexistence interference avoidance (IDC) reporting module 112 may allow the wireless communication device 104 to collect in-device coexistence interference avoidance (IDC) assistance information and report the in-device coexistence interference avoidance (IDC) assistance information to the eNB 102. In-device coexistence interference avoidance (IDC) assistance information may include Wi-Fi beacon information 181 such as a beacon duration 137, a protocol offset 138, a scan interval 139, a scan offset 140 and a beacon interval 141. In-device coexistence interference avoidance (IDC) assistance information may also include autonomous denial (ADN) data 142 such as a number of autonomous denial (ADN) occurrences 143, a longest autonomous denial (ADN) 144 or an average autonomous denial (ADN) 145. The in-device coexistence interference avoidance (IDC) assistance information is discussed in additional detail below in relation to FIG. 5.

The in-device coexistence interference avoidance (IDC) reporting module 112 may be a logical entity that is referred to as the ICO controller or the Centurial Scrutinizer (SC). The in-device coexistence interference avoidance (IDC) reporting module 112 may have various means and modes of connectivity with the Long Term Evolution (LTE) transceiver 110, the Wi-Fi transceiver 111, the Bluetooth transceiver 179, the Global Navigation Satellite Systems (GNSS) receiver 180 and the eNB 102. At the most basic level, the in-device coexistence interference avoidance (IDC) reporting module 112 may operate in an "Uncoordinated mode," whereby different technologies within the same wireless communication device 104 operate independently without any internal coordination (i.e., the in-device coexistence interference avoidance (IDC) reporting module 112 only interacts with the Long Term Evolution (LTE) transceiver 110). At a more sophisticated mode, the in-device coexistence interference avoidance (IDC) reporting module 112 may operate in a "Coordinated within UE Only" manner, where there is an internal coordination between the different radio technologies within the same wireless communication device 104. Thus, the activities of at least one radio may be known by another radio (i.e., the in-device coexistence interference avoidance (IDC) reporting module 112 interacts with the Long Term Evolution (LTE) transceiver 110 and at least one other transceiver). At the most complex mode, the in-device coexistence interference avoidance (IDC) reporting module 112 may operate in a "Coordinated within UE and with network" manner, whereby different radio technologies within the wireless communication device 104 are aware of possible coexistence problems and the wireless communication device 104 can inform the network about such problems (i.e., the in-device coexistence interference avoidance (IDC) reporting module 112 can interact with all the other transceivers and with the eNB 102).

The beacon duration 137 represents the time it takes for the wireless communication device 104 to transmit a beacon. The beacon duration 137 may have a value in the range of 0 . . . N and may have units of time (e.g., milliseconds (ms) or microseconds (μs)) or an index. The beacon interval 141 is the time between each beacon. The beacon interval 141 may have units of time or an index. The scan interval 139 is the amount of time between attempts to receive a beacon. The scan interval 139 may have units of time or an index.

The protocol offset 138 is the offset between the Wi-Fi protocol and the Long Term Evolution (LTE) protocol. The protocol offset 138 represents a delta from a specific point in the Long Term Evolution (LTE) protocol (e.g., Subframe 0 of System Frame 0) and a specific point in the Wi-Fi protocol (e.g., the start of a Wi-Fi beacon). The protocol offset 138 may have units of time or an index. The scan offset 140 represents a delta from a specific point in the Long Term Evolution (LTE) protocol (e.g., Subframe 0 of System Frame 0) and a specific point of the passive or active scan activity of the Wi-Fi transceiver 111 (e.g., the start of Wi-Fi beacon reception).

The in-device coexistence interference avoidance (IDC) reporting module 112 may include one or more Wi-Fi beacon reporting triggers 113 and an autonomous denial (ADN) data reporting trigger 114. The Wi-Fi beacon reporting triggers 113 and the autonomous denial (ADN) data reporting trigger 114 may be configured at the time the wireless communication device 104 is manufactured or configured by the eNB 102.

The Wi-Fi beacon reporting triggers 113 may include a beacon duration trigger 182 (referred to as IDCTriggerBD) that identifies certain conditions that, when met, cause the wireless communication device 104 to report beacon duration information to the eNB 102. The beacon duration trigger 182 may include a beacon delta value 127. If the absolute value of the difference between the latest beacon duration 137 reported to the eNB 102 and the most recently determined beacon duration 137 is greater than the beacon delta value 127, the wireless communication device 104 may send an indication (referred to as a beacon duration change indication) to the eNB 102 that the beacon duration 137 has changed and the direction (i.e., increase or decrease) of the change. In one configuration, the beacon duration change indication may only indicate the direction (i.e., increase or decrease) of the change. In another configuration, if the absolute value of the difference between the latest beacon duration 137 reported to the eNB 102 and the most recently determined beacon duration 137 is greater than the beacon delta value 127, the wireless communication device 104 may send the latest beacon duration 137 to the eNB 102. The beacon duration 137 sent to the eNB 102 is not necessarily restricted to the latest beacon duration 137. For example, a the beacon duration 137 may instead be an average of some of the beacon durations 137 or a beacon duration 137 that is different from the reported beacon duration 137.

The beacon duration trigger 182 may also include a beacon duration periodic reporting timer value 128. Upon receiving the beacon duration periodic reporting timer value 128 from an eNB 102, the in-device coexistence interference avoidance (IDC) reporting module 112 may start a timer using the beacon duration periodic reporting timer value 128. In one configuration, when the timer expires, the wireless communication device 104 may send an indication (referred to as a beacon duration change indication) to the eNB 102 that the beacon duration 137 has changed and the direction (i.e., increase or decrease) of the change. As discussed above, in one configuration, the beacon duration change indication may only indicate the direction (i.e., increase or decrease) of the change. The in-device coexistence interference avoidance (IDC) reporting module 112 may then restart the timer. In another configuration, when the timer expires, the wireless communication device 104 may send the latest beacon duration 137 to the eNB 102. The in-device coexistence interference avoidance (IDC) reporting module 112 may then restart the timer.

The Wi-Fi beacon reporting triggers 113 may also include a protocol offset trigger 183 (referred to as IDCTriggerPO). The protocol offset trigger 183 may identify certain conditions that, when met, cause the wireless communication device 104 to report protocol offset data to the eNB 102. The protocol offset trigger 183 may include a protocol offset slew value 129. If the value of a new protocol offset 138 is greater than or equal to the protocol offset slew value 129, the wireless communication device 104 may send the protocol offset 138 to the eNB 102.

The protocol offset trigger 183 may also include a protocol offset slew count 130. In one configuration, each time a new protocol offset 138 is greater than or equal to the protocol offset slew value 129, a counter may be incremented. Each time a new protocol offset 138 is less than the protocol offset slew value 129, the counter may be decremented. If the counter reaches the protocol offset slew count 130, the wireless communication device 104 may send the protocol offset 138 to the eNB 102 and reset the counter. The counter may be set to not go below zero.

The protocol offset trigger 183 may further include a periodic protocol offset slew timer value 131. Upon receiving the periodic protocol offset slew timer value 131, the in-device coexistence interference avoidance (IDC) reporting module 112 may start a timer using the periodic protocol offset slew timer value 131. In one configuration, when the timer expires, the wireless communication device 104 may send an indication to the eNB 102 (referred to as a protocol offset change indication) that the protocol offset 138 has changed and the direction (i.e., increase or decrease of the change). In another configuration, when the timer expires, the wireless communication device 104 may send the new protocol offset 138 to the eNB 102. When the timer expires, the in-device coexistence interference avoidance (IDC) reporting module 112 may restart the timer.

The Wi-Fi beacon reporting triggers 113 may further include a scan trigger 184 (referred to as IDCTriggerScan) that identifies certain conditions that, when met, cause the wireless communication device 104 to report the most recent scan data to the eNB 102. The scan trigger 184 may include a scan report value 185. If the scan report value 185 is set to TRUE, when the wireless communication device 104 receives an indication that the station (STA) (e.g., the Wi-Fi transceiver 111) has started a scan, the wireless communication device 104 may send the scan interval 139 and the scan offset 140 to the eNB 102. If the scan report value 185 is set to FALSE, when the wireless communication device 104 receives an indication that the station (STA) has started a scan, the wireless communication device 104 may not send the scan interval 139 or scan offset 140 to the eNB 102.

The in-device coexistence interference avoidance (IDC) reporting module 112 may include an autonomous denial (ADN) reporting trigger 114 (referred to as IDCTriggerADN) that identifies certain conditions that, when met, will cause the wireless communication device 104 to report the most recently obtained autonomous denial (ADN) data 142. The autonomous denial (ADN) reporting trigger 114 may include an autonomous denial (ADN) periodic report timer value 132. Upon receiving the autonomous denial (ADN) periodic report timer value 132, the in-device coexistence interference avoidance (IDC) reporting module 112 may start a timer. In one configuration, upon expiration of the timer, the wireless communication device 104 may send the number of autonomous denial (ADN) occurrences 143 that occurred while the timer was running to the eNB 102. In another configuration, upon expiration of the timer, the wireless communication device 104 may send the timing information of autonomous denial (ADN) occurrences 143 that occurred while the timer was running to the eNB 102. In yet another configuration, upon expiration of the timer, the wireless communication device 104 may send information of the longest autonomous denial (ADN) 144 that occurred while the timer was running to the eNB 102. In another configuration, upon expiration of the timer, the wireless communication device 104 may send the average autonomous denial (ADN) 145 that occurred while the timer was running to the eNB 102.

The in-device coexistence interference avoidance (IDC) reporting module 112 may maintain an interference indication variable 115 that tracks the state of interference. The interference indication variable 115 may be used to track whether interference is occurring between multiple transceivers on the wireless communication device 104.

In one configuration, a single timer may use the beacon duration periodic reporting timer value 128, the periodic protocol offset slew timer value 131 and the autonomous denial (ADN) periodic report timer value 132. If the wireless communication device 104 receives new Wi-Fi beacon reporting trigger configurations or a new autonomous denial (ADN) reporting trigger configuration, the new configuration may overwrite any previous configurations (such as those made at the time of manufacture). One benefit of the in-device coexistence interference avoidance (IDC) reporting module 112 is that it is able to adapt to changes in Wi-Fi transmission periods. The present systems and methods are able to coexist with the Long Term Evolution (LTE) DRX procedures, while having a minimal impact on the existing Long Term Evolution (LTE) scheduling procedures in both the wireless communication device 104 and the eNB 102. Furthermore, the in-device coexistence interference avoidance (IDC) reporting module 112 requires only a minimum of additional protocol resources to implement.

One benefit of the in-device coexistence interference avoidance (IDC) reporting module 112 is that the eNB 102 can be informed of an increase in the Wi-Fi beacon duration 137, thereby enabling the eNB 102 to schedule Long Term Evolution (LTE) uplink resources that do not interfere with the extended Wi-Fi beacon duration 137. Another benefit of the in-device coexistence interference avoidance (IDC) reporting module 112 is that the eNB 102 can be informed of a decrease in the Wi-Fi beacon duration 137, thereby enabling the eNB 102 to schedule Long Term Evolution (LTE) uplink resources that would otherwise be wasted.

The wireless communication device 104 may include an in-device coexistence interference avoidance (IDC) mitigation module 116a. The wireless communication device 104 may use the in-device coexistence interference avoidance (IDC) mitigation module 116a to apply autonomous denial (ADN) as instructed by the eNB 102 to block either a user equipment (UE) transmission or a Wi-Fi transmission. When the autonomous denial (ADN) is applied may be decided by the in-device coexistence interference avoidance (IDC) mitigation module 116a.

The eNB 102 may include an in-device coexistence interference avoidance (IDC) mitigation module 116b. Upon receiving in-device coexistence interference avoidance (IDC) assistance information from the wireless communication device 104, the in-device coexistence interference avoidance (IDC) mitigation module 116b may use smart scheduling to ensure that Long Term Evolution (LTE) procedures do not collide with Wi-Fi beacon related procedures. Specifically, the in-device coexistence interference avoidance (IDC) mitigation module 116b may ensure that Long Term Evolution (LTE) user equipment (UE) drx-inactivity periods are aligned with Wi-Fi beacon periods. Upon receiving in-device coexistence interference avoidance (IDC) assistance information, the eNB 102 may correctly classify recent and near future missing Long Term Evolution (LTE) uplink data as not being caused by radio link failure (RLF), and thus the missing Long Term Evolution (LTE) uplink data does not impact the physical downlink control channel (PDCCH) and physical uplink shared channel (PUSCH) link adaptation.

To handle deterministic beacons, the eNB 102 may not allow the wireless communication device 104 to perform autonomous denial (ADN) for the collision between Long Term Evolution (LTE) and a Wi-Fi beacon. The eNB 102 may then perform only smart scheduling based on the Wi-Fi beacon information 181 received from the wireless communication device 104. In another configuration, to handle deterministic beacons, the eNB 102 may allow the wireless communication device 104 to perform autonomous denial (ADN) for the collision between Long Term Evolution (LTE) and a Wi-Fi beacon. The wireless communication device 104 may then send Wi-Fi beacon information 181 or a report of the occurrence of autonomous denial (ADN) to the eNB 102.

Because the fundamental period of the Wi-Fi protocol and the Long Term Evolution (LTE) protocol are different, any alignment between the Long Term Evolution (LTE) and Wi-Fi activities will slew over time. This type of slew is known as deterministic slew, since it is predictable. Deterministic slew will eventually cause an initial alignment between the Long Term Evolution (LTE) protocol and the Wi-Fi protocol (e.g., via a DRX configuration) to become misaligned. As a result, the Wi-Fi beacon periods may not remain in the same relative position to the drx-inactivity period as initially intended by the DRX configuration. Instead, the Wi-Fi beacon periods may shift over time into a drxOnDuration period (and then continue to shift back to a drx-inactivity period). Because the eNB 102 knows the slew rate of the Long Term Evolution (LTE) and Wi-Fi protocols, the eNB 102 may not schedule any Long Term Evolution (LTE) protocol resources that would result in an uplink transmission by the wireless communication device 104 that coincide with the Wi-Fi beacon reception period. To do this, the eNB 102 must also know the beacon duration 137 used by Wi-Fi.

While the slew between the Long Term Evolution (LTE) and Wi-Fi protocols is deterministic, the duration of the Wi-Fi beacon period is non-static (and will change over time). This is because the Wi-Fi beacon carries both fixed and variable data fields. For example, the Traffic Indication Message (TIM) element (carried by the Wi-Fi beacon)

includes six fields: Element ID, Length, DTIM Count, DTIM Period, Bitmap Control and Partial Virtual Bitmap (PVB). The Partial Virtual Bitmap (PVB) is variable in length from 1 to 251 octets, where each bit in the Partial Virtual Bitmap (PVB) corresponds to traffic buffered for a specific station (STA) that the access point 106 is prepared to deliver at the time the Wi-Fi beacon is transmitted.

One difficulty for the eNB 102 is determining how much of the Long Term Evolution (LTE) resources should be reserved for the Wi-Fi beacon. If the eNB 102 assumes that the Traffic Indication Message (TIM) element always includes the maximum number of Partial Virtual Bitmap (PVB) octets, Long Term Evolution (LTE) resources may be wasted. If the eNB 102 assumes that the Traffic Indication Message (TIM) element always includes the minimum number of Partial Virtual Bitmap (PVB) octets, a collision between the Long Term Evolution (LTE) uplink and the Wi-Fi beacon may occur.

Additionally, a shift in the relationship between the Wi-Fi protocol and the Long Term Evolution (LTE) protocol may be caused by the access point 106 delaying the Wi-Fi beacon due to channel congestion. This shift is known as non-deterministic slew, as it is not predictable (although it is related to the load of the access point 106). The non-deterministic slew is not cumulative, as the next transmission of the Wi-Fi beacon will occur at the beacon interval (if it not again delayed due to congestion). Because non-deterministic slew is not predictable, the eNB 102 cannot use scheduling to prevent Long Term Evolution (LTE) uplink transmissions from colliding with the Wi-Fi beacon periods.

The in-device coexistence interference avoidance (IDC) mitigation module 116b may also use the in-device coexistence interference avoidance (IDC) assistance information to determine the possibility and/or history of autonomous denial (ADN) caused by Wi-Fi beacon related procedures. This may assist the eNB 102 in understanding the difference between actual channel conditions and the conditions caused by autonomous denial (ADN). The in-device coexistence interference avoidance (IDC) mitigation module 116b may send reporting trigger configurations to the wireless communication device 104 to mitigate interference.

Figure 2:
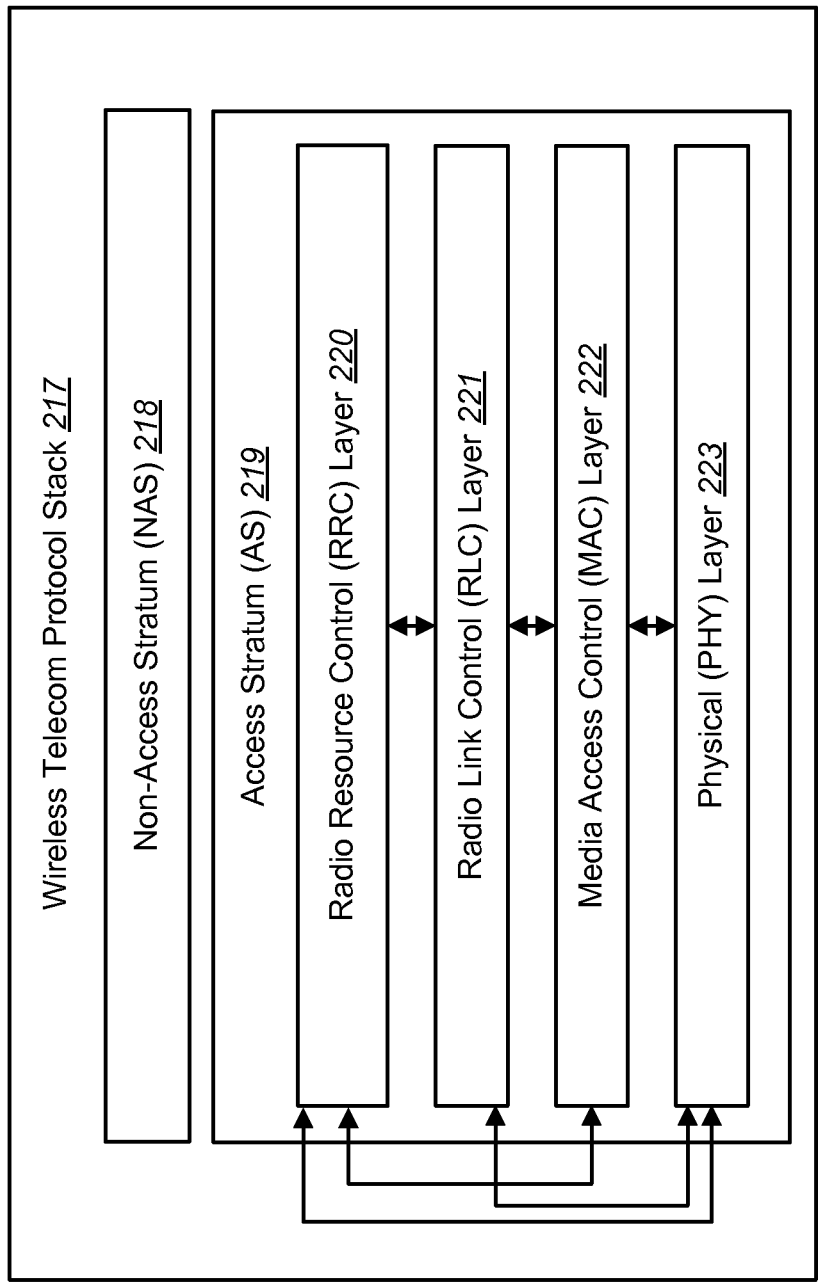
FIG. 2 is a block diagram illustrating a wireless telecom protocol stack.

FIG. 2 is a block diagram illustrating a wireless telecom protocol stack 217. The wireless telecom protocol stack 217 may include a Non-Access Stratum (NAS) 218 and an Access Stratum (AS) 219. The Non-Access Stratum (NAS) 218 is a functional layer that forms the stratum above the Long Term Evolution (LTE) control plane and includes the protocols that handle activities between the wireless communication device 104 and the core network. The Access Stratum (AS) 219 is a functional layer that includes the protocols that handle activities between the wireless communication device 104 and the eNB 102. The Access Stratum (AS) 219 may include the Radio Resource Control (RRC) layer 220, the Radio Link Control (RLC) layer 221, the Media Access Control (MAC) layer 222 and the Physical (PHY) layer 223. The Radio Resource Control (RRC) layer 220 is the top most layer of the Access Stratum (AS) 216 used for processing Long Term Evolution (LTE) Radio Resource Control (RRC) type messages.

Figure 3:
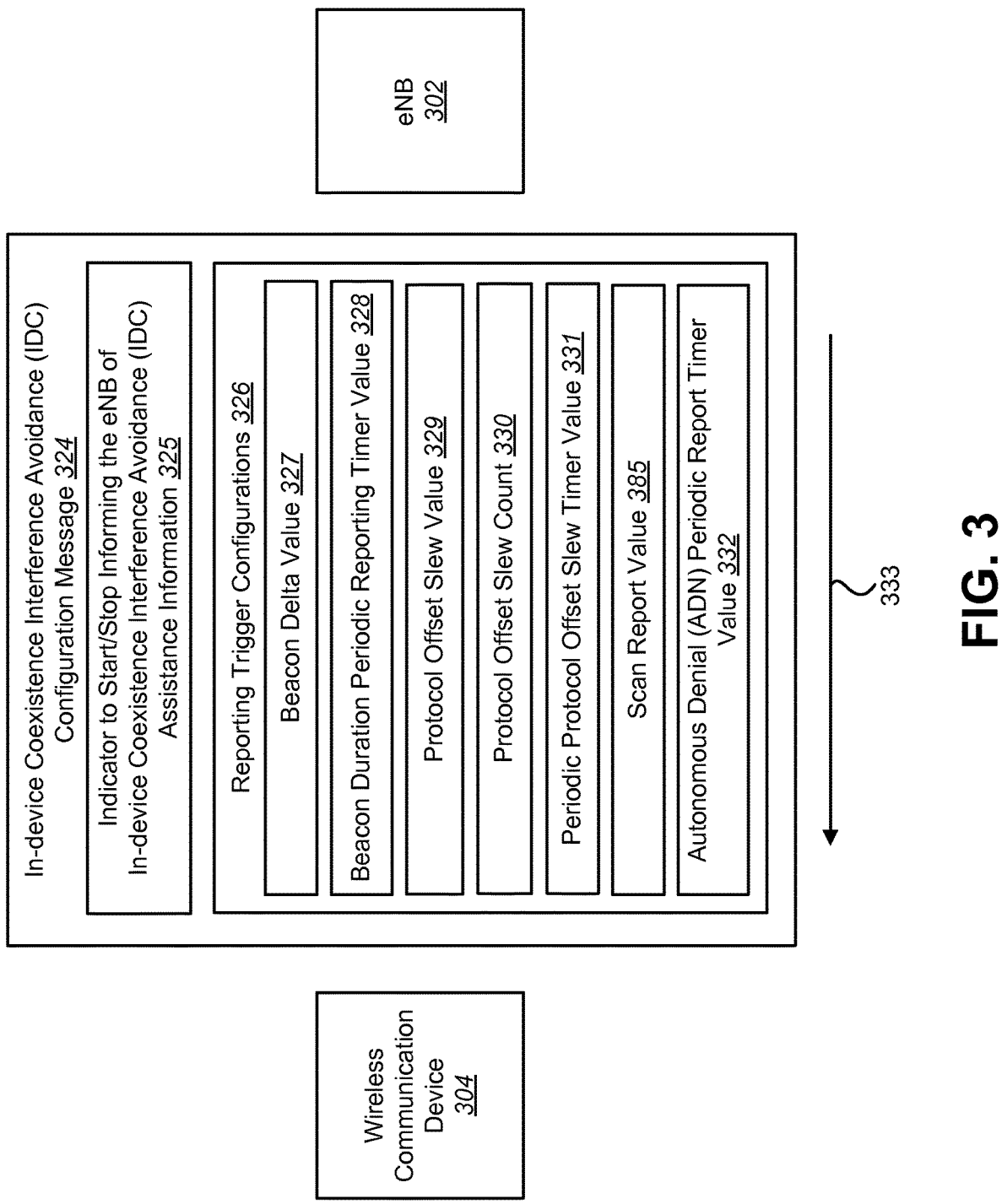
FIG. 3 illustrates the transmission of an in-device coexistence interference avoidance (IDC) configuration message from an eNB to a wireless communication device.

FIG. 3 illustrates the transmission of an in-device coexistence interference avoidance (IDC) configuration message 324 from an eNB 302 to a wireless communication device 304. The wireless communication device 304 of FIG. 3 may be one configuration of the wireless communication device 104 of FIG. 1. The eNB 302 of FIG. 3 may be one configuration of the eNB 102 of FIG. 1. The in-device coexistence interference avoidance (IDC) configuration message 324 may be a new radio resource control (RRC) message called IDC-Config. The in-device coexistence interference avoidance (IDC) configuration message 324 may be part of a MAC-MainConfig information element 333 in a RadioResourceConfigDedicated message, an RRCConnection Reconfiguration message, an RRCConnection Reestablishment message or an RRCConnectionSetup message in response to an in-device coexistence interference avoidance (IDC) assistance information message transmitted by the wireless communication device 304 to the eNB 302 indicating a coexistence problem.

The in-device coexistence interference avoidance (IDC) configuration message 324 may be generated by the in-device coexistence interference avoidance (IDC) mitigation module 116b. The in-device coexistence interference avoidance (IDC) configuration message 324 may configure an in-device coexistence interference avoidance (IDC) mitigation procedure (i.e., DRx) for the in-device coexistence interference avoidance (IDC) mitigation module 116a on the wireless communication device 304. In one configuration, the in-device coexistence interference avoidance (IDC) configuration message 324 may be transmitted using radio resource control (RRC) signaling.

The in-device coexistence interference avoidance (IDC) configuration message 324 may include an indicator 325 to start/stop informing the eNB 302 of in-device coexistence interference avoidance (IDC) assistance information. The in-device coexistence interference avoidance (IDC) configuration message 324 may also include reporting trigger configurations 326. The reporting trigger configurations 326 may supersede any reporting trigger configurations used by an in-device coexistence interference avoidance (IDC) reporting module 112 on the wireless communication device 304. The reporting trigger configurations 326 may include one or more of a beacon delta value 327, a beacon duration periodic reporting timer value 328, a protocol offset slew value 329, a protocol offset slew count 330, a periodic protocol offset slew timer value 331, a scan report value 385 and an autonomous denial (ADN) periodic report timer value 332.

Figure 4:
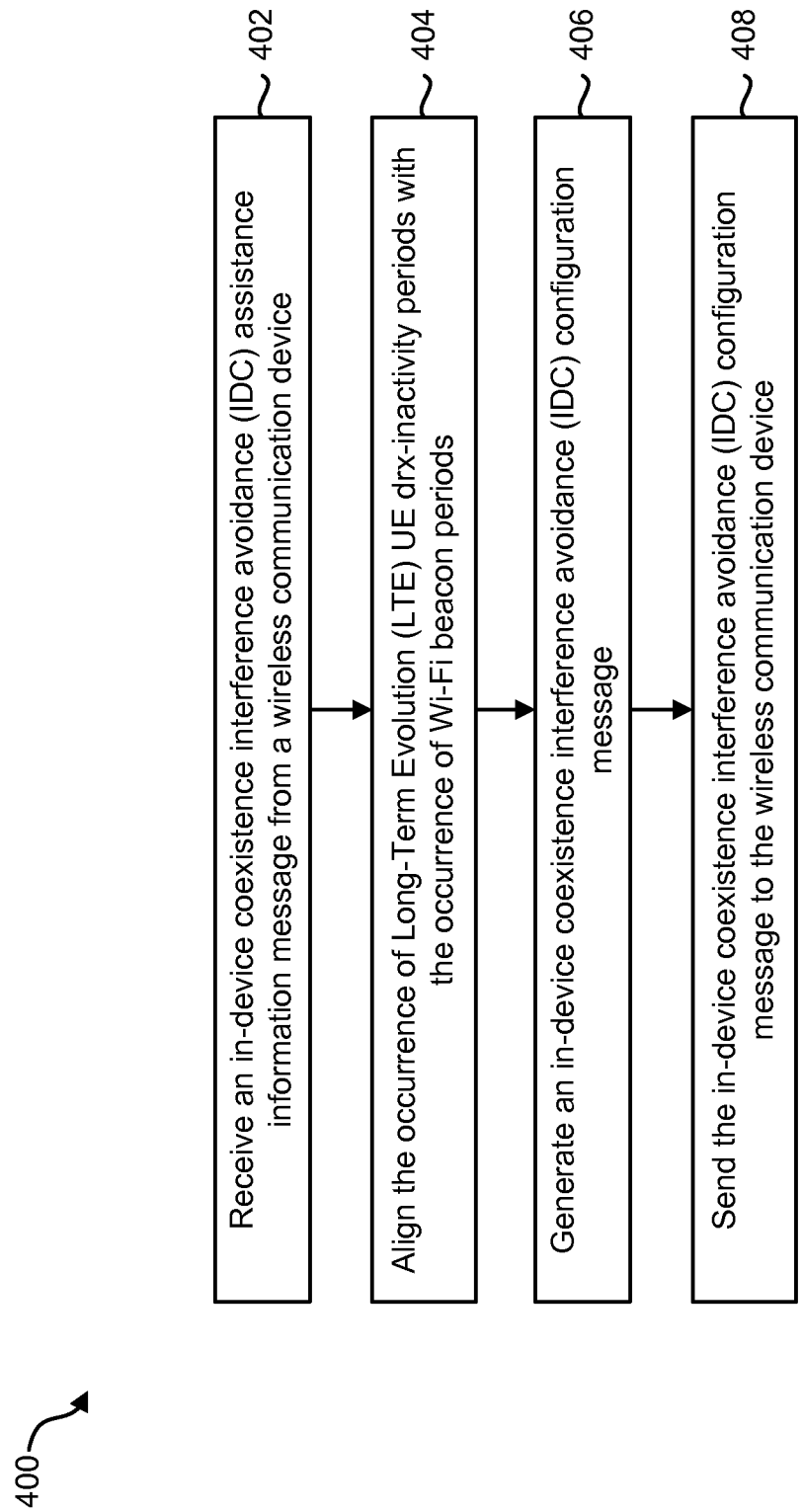
FIG. 4 is a flow diagram of a method for in-device coexistence interference avoidance (IDC)

FIG. 4 is a flow diagram of a method 400 for in-device coexistence interference avoidance (IDC). The method 400 may be performed by an eNB 102. The eNB 102 may receive 402 an in-device coexistence interference avoidance (IDC) assistance information message from a wireless communication device 104. The eNB 102 may align 404 the occurrence of Long Term Evolution (LTE) user equipment (UE) drx-inactivity periods with the occurrence of Wi-Fi beacon periods. In other words, the eNB 102 may ensure that no Long Term Evolution (LTE) user equipment (UE) uplink transmissions are scheduled during the Wi-Fi beacon periods. The eNB 102 may generate 406 an in-device coexistence interference avoidance (IDC) configuration message 324. The eNB 102 may send 408 the in-device coexistence interference avoidance (IDC) configuration message 324 to the wireless communication device 104.

Figure 5:
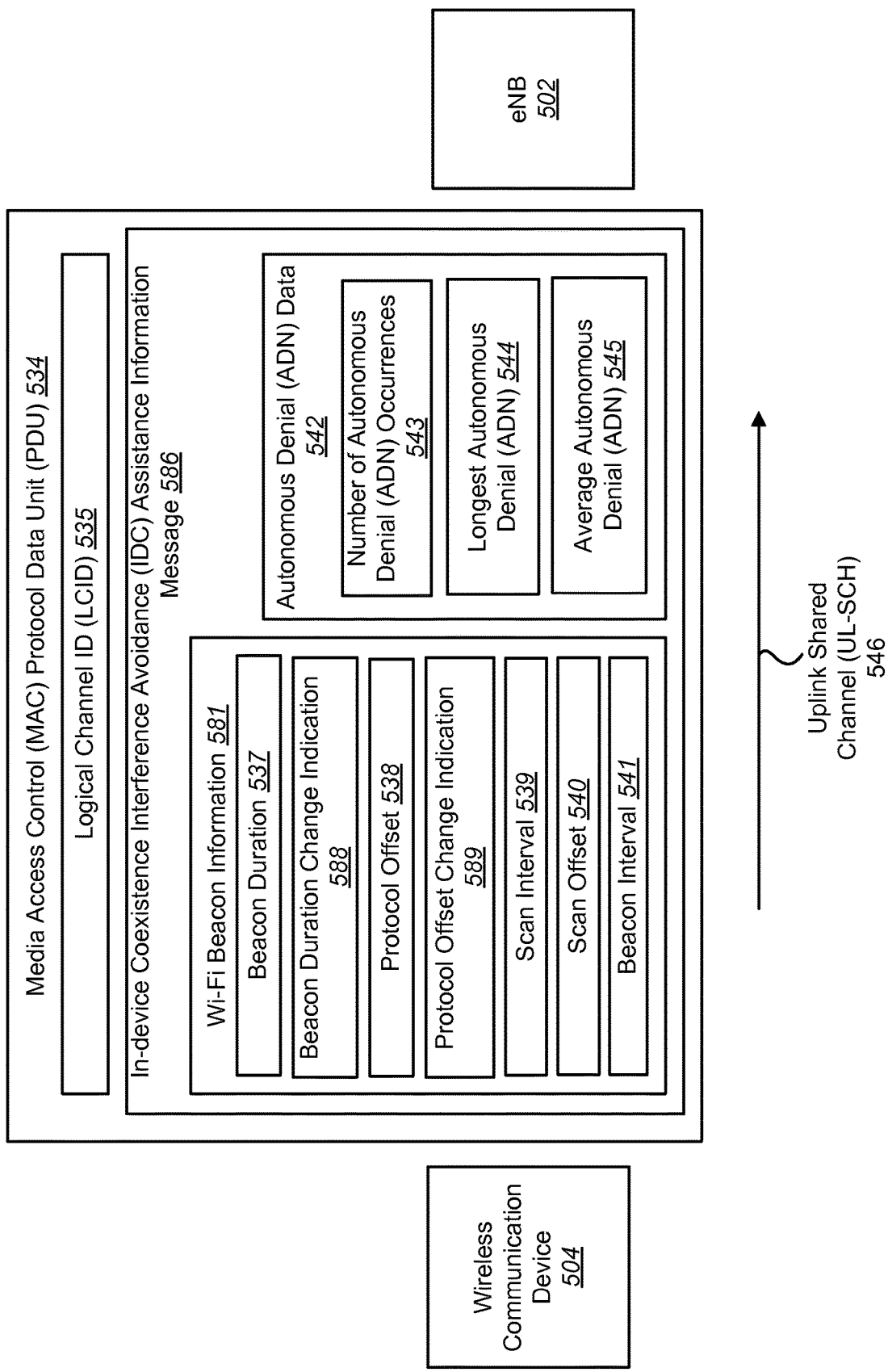
FIG. 5 illustrates the transmission of a media access control (MAC) protocol data unit (PDU) from a wireless communication device to an eNB.

FIG. 5 illustrates the transmission of a media access control (MAC) protocol data unit (PDU) 534 from a wireless communication device 504 to an eNB 502. The wireless communication device 504 of FIG. 5 may be one configuration of the wireless communication device 104 of FIG. 1. The eNB 502 of FIG. 5 may be one configuration of the eNB 102 of FIG. 1. The media access control (MAC) protocol data unit (PDU) 534 may be transmitted on the uplink shared channel (UL-SCH) 546.

The media access control (MAC) protocol data unit (PDU) 534 may include a new media access control (MAC) control element (CE) that includes an in-device coexistence interference avoidance (IDC) assistance information message 586. The name for the new media access control (MAC) control element (CE) may be IDC Report. The purpose of the new media access control (MAC) control element (CE) is to provide a means for the wireless communication device 504 to report the in-device coexistence interference avoidance (IDC) assistance information message 586 to the eNB 502. The media access control (MAC) control element (CE) may be identified by the media access control (MAC) protocol data unit (PDU) subheader with a logical channel ID (LCID) 535. The value of the logical channel ID (LCID) 535 may be derived from a list of reserved (i.e., unused and available) logical channel IDs (LCIDs) for the uplink shared channel (UL-SCH) 546. The value of the logical channel ID (LCID) 535 may range from 11 to 25 (i.e., 01011b-11001b). In one specific configuration, the logical channel ID (LCID) 535 may be 11. The media access control (MAC) control element (CE) has a fixed size of five octets.

The in-device coexistence interference avoidance (IDC) assistance information message 586 may include Wi-Fi beacon information 581. The Wi-Fi beacon information 581 may include a beacon duration 537, a beacon duration change indication 588, a protocol offset 538, a protocol offset change indication 589, a scan interval 539, a scan offset 540 and a beacon interval 541. The in-device coexistence interference avoidance (IDC) assistance information message 586 may also include autonomous denial (ADN) data 542. The autonomous denial (ADN) data 542 may include the number of autonomous denial (ADN) occurrences 543, the longest autonomous denial (ADN) 544 or the average autonomous denial (ADN) 545. In one configuration, the autonomous denial (ADN) data 542 may also include the timing that the autonomous denial (ADN) occurred.

The values carried by each of the octets may range from 0 to 255d. The octets may include the beacon duration 537 and/or the protocol offset 538 and/or the scan interval 539 and/or the scan offset 540 and/or the autonomous denial (ADN) data 542. The values carried by the media access control (MAC) control element (CE) may be an index value Is (0, 1, 2 . . . 255). Alternatively, the value may be an unsigned time value Ts (0, 1, 2 . . . 255). The value may also be a signed time value Ts (−128, −126 . . . 0, 1, 2 . . . 127).

Figure 6:
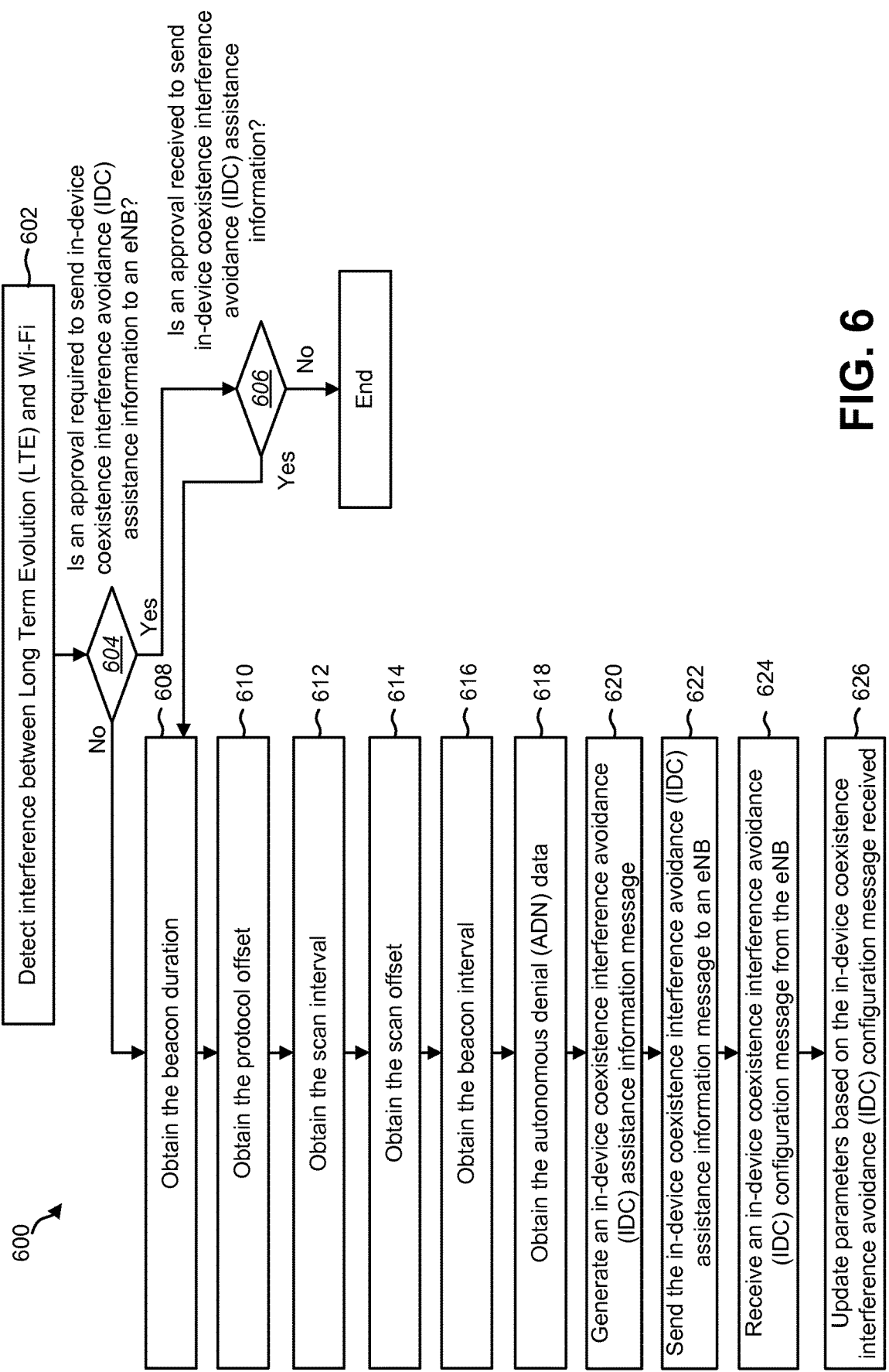
FIG. 6 is a flow diagram of a method for reporting in-device coexistence interference avoidance (IDC) assistance information to an eNB. The method may be performed by a wireless communication device.

FIG. 6 is a flow diagram of a method 600 for reporting in-device coexistence interference avoidance (IDC) assistance information to an eNB 102. The method 600 may be performed by a wireless communication device 104. The wireless communication device 104 may detect 602 interference between Long Term Evolution (LTE) and Wi-Fi. The wireless communication device 104 may determine 604 whether an approval is required to send in-device coexistence interference avoidance (IDC) assistance information to an eNB 102. If an approval is required to send in-device coexistence interference avoidance (IDC) assistance information to an eNB 102, the wireless communication device 104 may determine 606 whether an approval to send in-device coexistence interference avoidance (IDC) assistance information was received. If an approval to send in-device coexistence interference avoidance (IDC) assistance information was not received, the method 600 may end.

If an approval to send in-device coexistence interference avoidance (IDC) assistance information was received, the wireless communication device 104 may obtain 608 the beacon duration 137. If an approval is not required to send in-device coexistence interference avoidance (IDC) assistance information to the eNB 102, the wireless communication device 104 may obtain 608 the beacon duration 137. The wireless communication device 104 may monitor the transmission and reception activities of an AP station (AP) and/or a non-AP station (STA) and Long Term Evolution (LTE) to obtain 608 the duration of the Wi-Fi beacon, known as the beacon duration 137.

The wireless communication device 104 may also obtain 610 the protocol offset 138. The wireless communication device 104 may monitor the transmission and reception activities of an AP station (AP) and/or a non-AP station (STA) and Long Term Evolution (LTE) to obtain 610 the protocol offset 138. The wireless communication device 104 may further obtain 612 the scan interval 139. The wireless communication device 104 may monitor the transmission and reception activities of a non-AP station (STA) and Long Term Evolution (LTE) to obtain 612 the scan interval 139. The wireless communication device 104 may also obtain 614 the scan offset 140. The wireless communication device 104 may monitor the transmission and reception activities of a non-AP station (STA) and Long Term Evolution (LTE) to obtain 614 the scan offset 140.

The wireless communication device 104 may further obtain 616 the beacon interval 141. The wireless communication device 104 may monitor the transmission and reception activities of an AP station (AP) and/or a non-AP station (STA) and Long Term Evolution (LTE) to obtain 616 the beacon interval 141. The wireless communication device 104 may also obtain 618 the autonomous denial (ADN) data 142.

The wireless communication device 104 may generate 620 an in-device coexistence interference avoidance (IDC) assistance information message 586. The wireless communication device 104 may then send 622 the in-device coexistence interference avoidance (IDC) assistance information message 586 to an eNB 102. The wireless communication device 104 may receive 624 an in-device coexistence interference avoidance (IDC) configuration message 324 from the eNB 102. The wireless communication device 104 may then update 626 parameters based on the in-device coexistence interference avoidance (IDC) configuration message 324 received.

Figure 7:
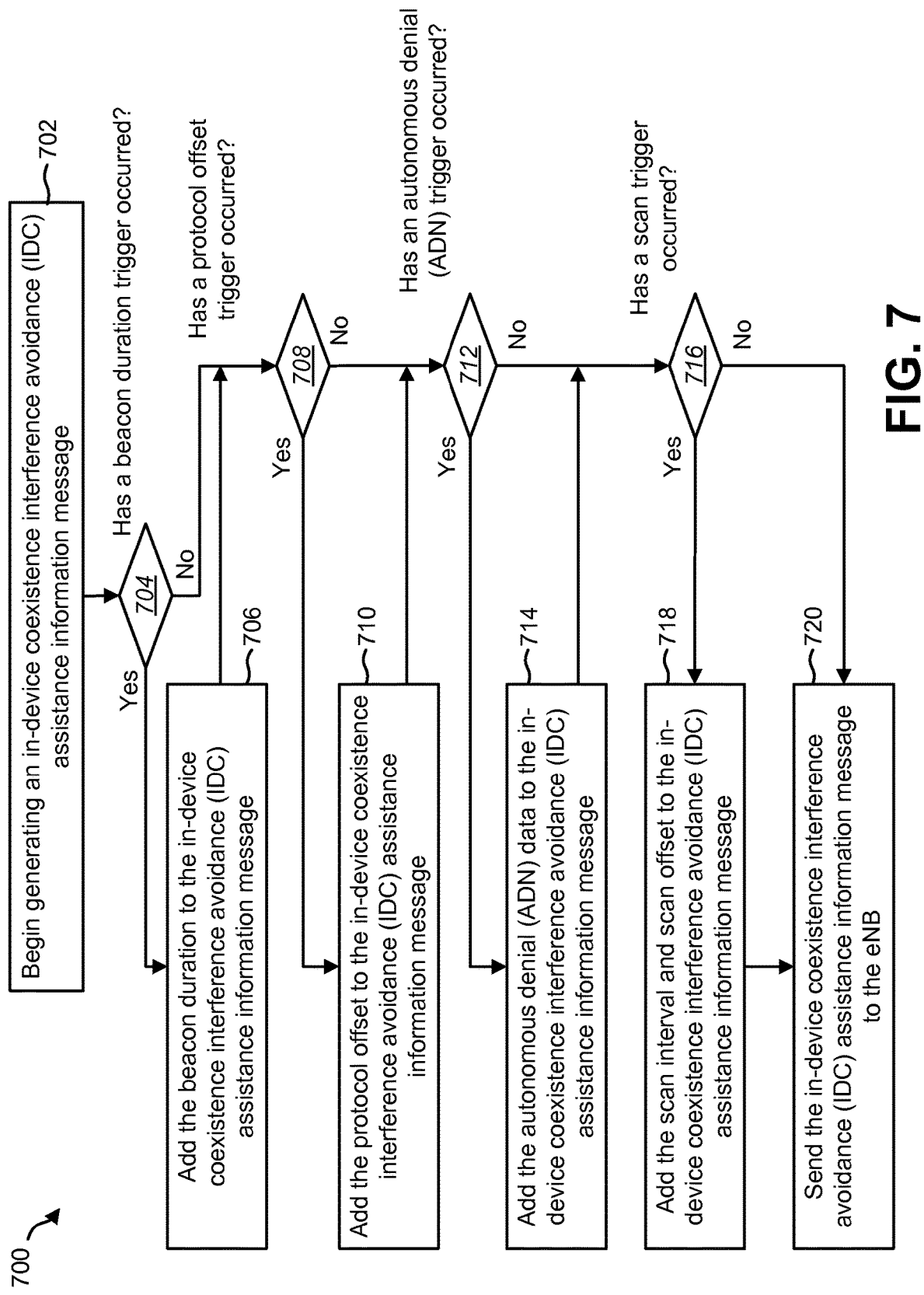
FIG. 7 is a flow diagram of a method for generating an in-device coexistence interference avoidance (IDC) assistance information message.

FIG. 7 is a flow diagram of a method 700 for generating an in-device coexistence interference avoidance (IDC) assistance information message 586. The method 700 may be performed by a wireless communication device 104. The wireless communication device 104 may begin 702 generating an in-device coexistence interference avoidance (IDC) assistance information message 586. The wireless communication device 104 may determine 704 whether a beacon duration trigger 182 has occurred. If a beacon duration trigger 182 has occurred, the wireless communication device 104 may add 706 the beacon duration 537 to the in-device coexistence interference avoidance (IDC) assistance information message 586 and determine 708 whether a protocol offset trigger 183 has occurred. If a beacon duration trigger 182 has not occurred, the wireless communication device 104 may determine 708 whether a protocol offset trigger 183 has occurred.

If a protocol offset trigger 183 has occurred, the wireless communication device 104 may add 710 the protocol offset 538 to the in-device coexistence interference avoidance (IDC) assistance information message 586. The wireless communication device 104 may then determine 712 whether an autonomous denial (ADN) trigger 114 has occurred. If a protocol offset trigger 183 has not occurred, the wireless communication device 104 may determine 712 whether an autonomous denial (ADN) trigger 114 has occurred. If an autonomous denial (ADN) trigger 114 has occurred, the wireless communication device 104 may add 714 the autonomous denial (ADN) data 542 to the in-device coexistence interference avoidance (IDC) assistance information message 586. The wireless communication device 104 may then determine 716 whether a scan trigger 184 has occurred. If an autonomous denial (ADN) trigger 114 has not occurred, the wireless communication device 104 may determine 716 whether a scan trigger 184 has occurred.

If a scan trigger 184 has occurred, the wireless communication device 104 may add 718 the scan interval 539 and the scan offset 540 to the in-device coexistence interference avoidance (IDC) assistance information message 586. The wireless communication device 104 may then send 720 the in-device coexistence interference avoidance (IDC) assistance information message 586 to the eNB 102. If a scan trigger 184 has not occurred, the wireless communication device 104 may send 720 the in-device coexistence interference avoidance (IDC) assistance information message 586 to the eNB 102. If the in-device coexistence interference avoidance (IDC) assistance information message 586 is empty (i.e., none of the triggers occurred), the wireless communication device 104 may not send 720 the in-device coexistence interference avoidance (IDC) assistance information message 586 to the eNB 102.

Figure 8:
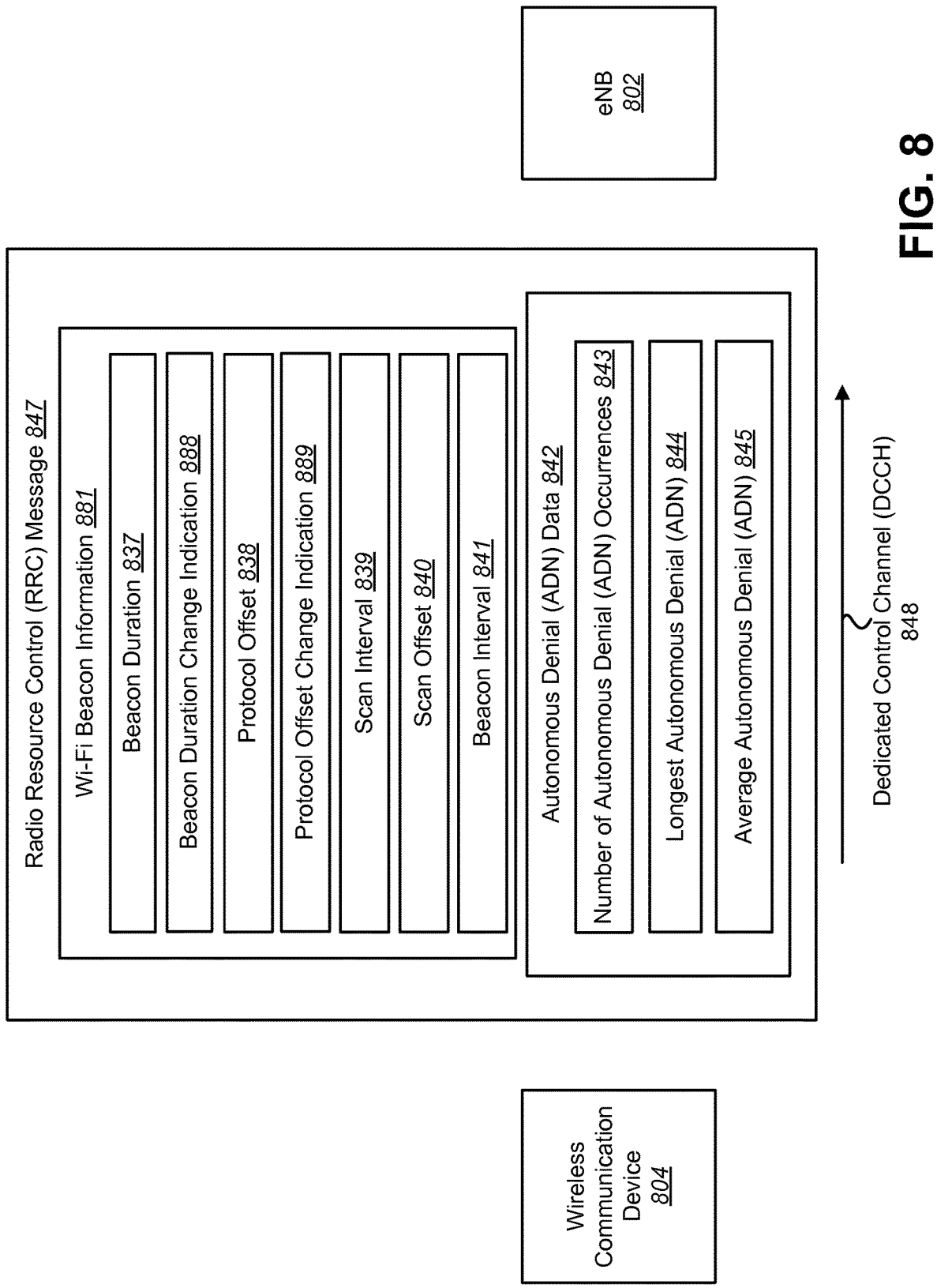
FIG. 8 illustrates the transmission of a radio resource control (RRC) message that includes in-device coexistence interference avoidance (IDC) assistance information from a wireless communication device to an eNB.

FIG. 8 illustrates the transmission of a radio resource control (RRC) message 847 that includes in-device coexistence interference avoidance (IDC) assistance information from a wireless communication 104 device to an eNB 102. A radio resource control (RRC) message 847 has more encoding and redundancy than a media access control (MAC) protocol data unit (PDU) 534. A radio resource control (RRC) message 847 may be used for larger data objects that are non-time critical lower priority communications.

The wireless communication device 804 of FIG. 8 is one configuration of the wireless communication device 104 of FIG. 1. The eNB 802 of FIG. 8 is one configuration of the eNB 102 of FIG. 1. A new radio resource control (RRC) message 847 is defined for the transmission of in-device coexistence interference avoidance (IDC) assistance information called in-device coexistence interference avoidance (IDC)-AssistanceInformation or idcReport. The radio resource control (RRC) message 847 is of type UL-DCCH-MessageType and is part of the UL-DCCH-Message class. The radio resource control (RRC) message 847 may be carried on the dedicated control channel (DCCH) 848. The radio resource control (RRC) message 847 may include at least five octets. The values carried by each octet may range from 0 to 255d. The values carried by the radio resource control (RRC) message 847 may be an index value Is (0, 1, 2 . . . 255). Alternatively, the value may be an unsigned time value Ts (0, 1, 2 . . . 255). The value may also be a signed time value Ts (−128, −126 . . . 0, 1, 2 . . . 127).

When the wireless communication device 804 determines that the interference indication variable 115 is set to true (and thus interference is occurring), the wireless communication device 804 may use the radio resource control (RRC) message 847 to transport information related to the interference to the eNB 802. In one configuration, the wireless communication device 804 may only transport the radio resource control (RRC) message 847 to the eNB 802 when the wireless communication device 804 has received a prior indication from the eNB 802 to do so. In another configuration, the wireless communication device 804 may transport the radio resource control (RRC) message 847 to the eNB 802 without receiving prior indication from the eNB 802 to do so.

The radio resource control (RRC) message 847 may include Wi-Fi beacon information 881 such as the beacon duration 837, the beacon duration change indication 888, the protocol offset 838, the protocol offset change indication 889, the scan interval 839, the scan offset 840 and the beacon interval 841. The radio resource control (RRC) message 847 may also include the autonomous denial (ADN) data 842 (such as the number of autonomous denial (ADN) occurrences 843, the largest autonomous denial (ADN) 844 or the average autonomous denial (ADN) 845).

Figure 9:
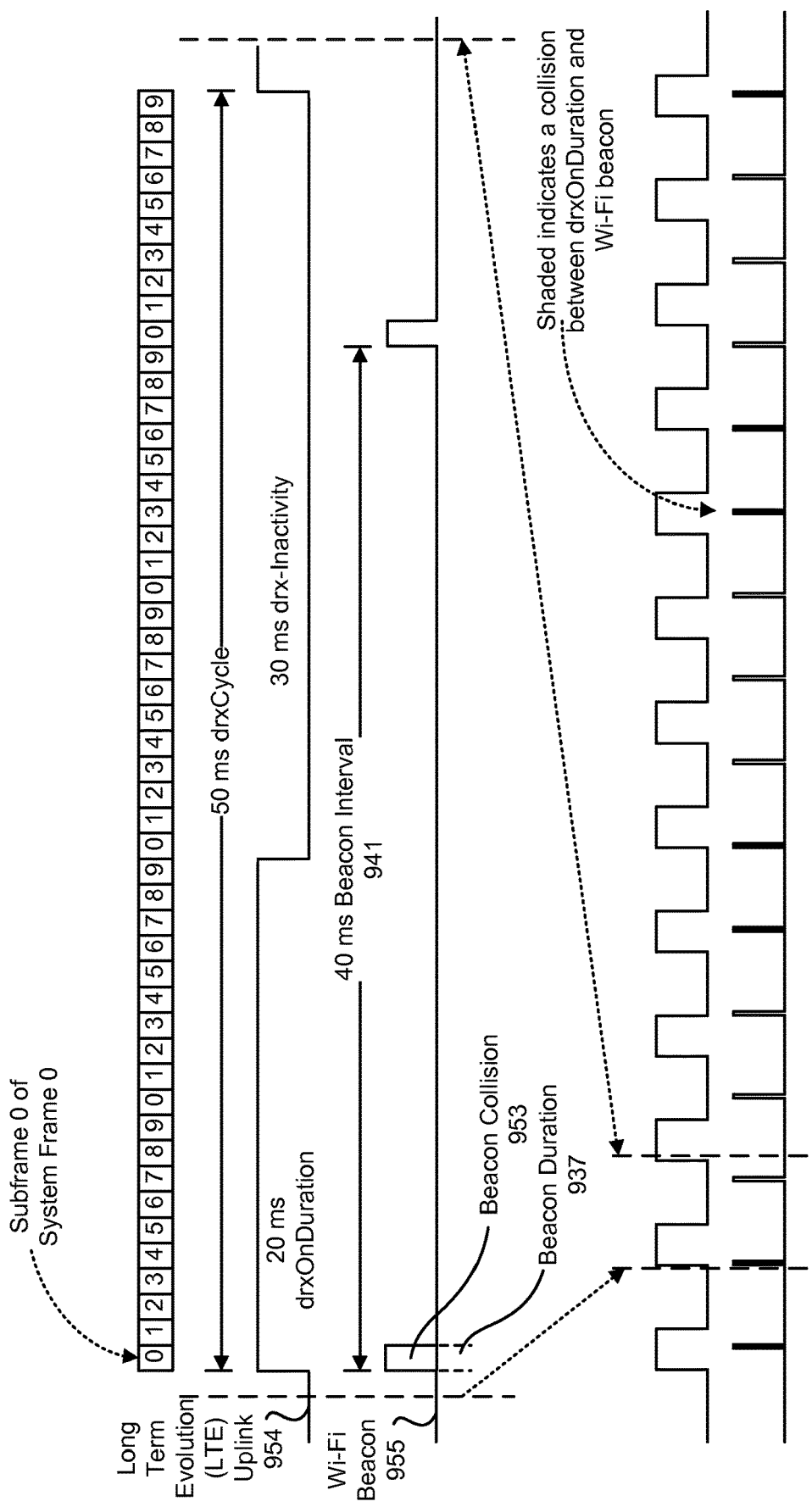
FIG. 9 is a timing diagram illustrating the relationship between Long Term Evolution (LTE) protocol timing and Wi-Fi beacon timing.

FIG. 9 is a timing diagram illustrating the relationship between Long Term Evolution (LTE) protocol timing and Wi-Fi beacon timing. One 50 ms drxCycle is shown for Long Term Evolution (LTE) uplink 954. A drxCycle may include 50 subframes that are 1 ms each. During the 20 ms drxOnDuration, the Long Term Evolution (LTE) uplink 954 is active (i.e., the wireless communication device 104 may transmit on the Long Term Evolution (LTE) uplink 954). During the 30 ms drx-Inactivity, the Long Term Evolution (LTE) uplink 954 is not active. A Wi-Fi beacon 955 is also shown. The Wi-Fi beacon 955 may have a period of 40 ms (i.e., a 40 ms beacon interval 941) and a beacon duration 937 of 1 ms. Thus, the Wi-Fi beacon period and the Long Term Evolution (LTE) uplink period do not line up.

A beacon collision 953 may occur between a Wi-Fi beacon 955 reception by the wireless communication device 104 and a Long Term Evolution (LTE) uplink 954 transmission by the wireless communication device 104 if the Wi-Fi beacon 955 is received during the 20 ms drxOnDuration. As is shown in the figure, the offset between the Long Term Evolution (LTE) protocol timing and the Wi-Fi beacon timing may result in collisions occurring irregularly.

Figure 10:
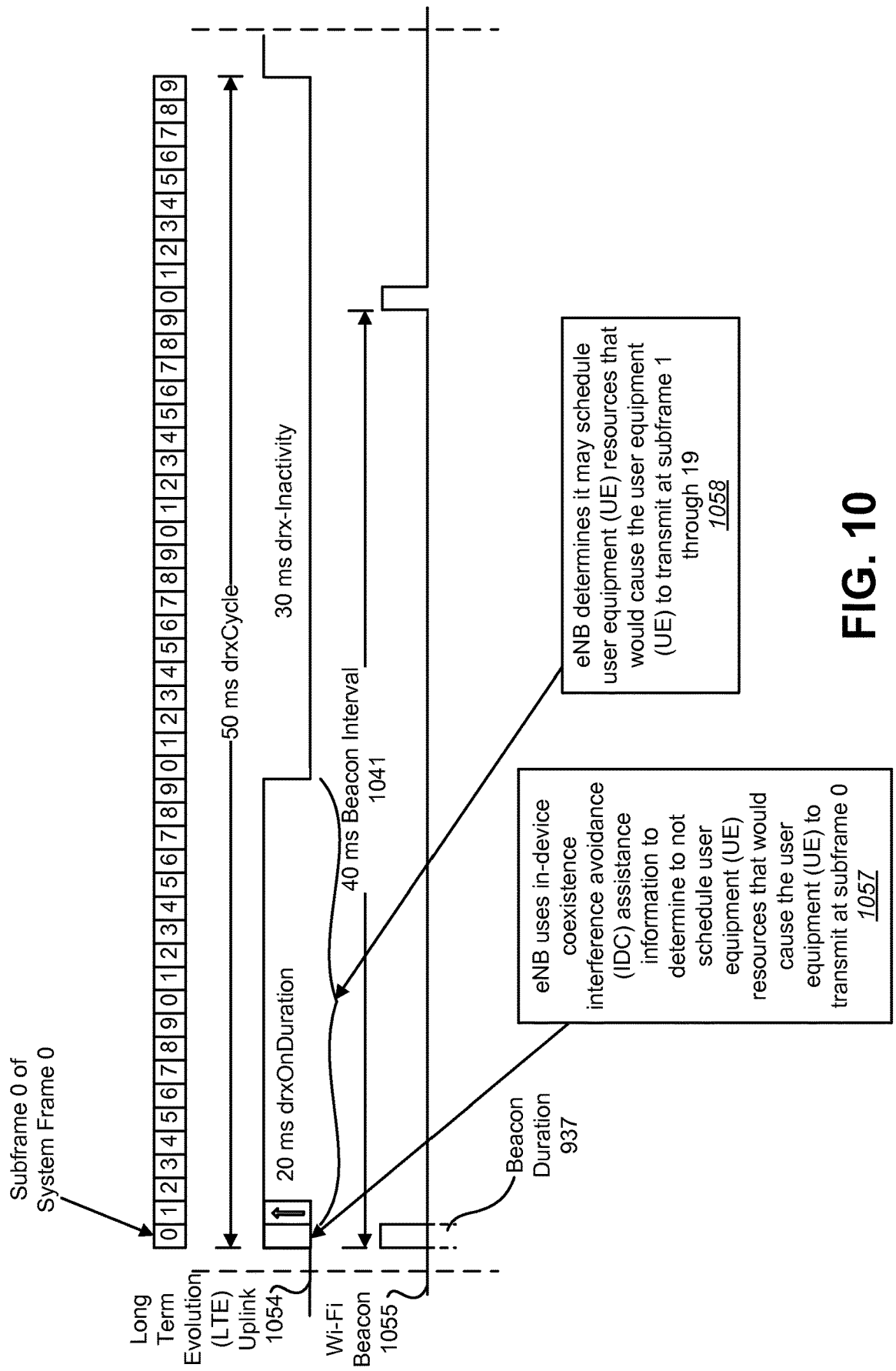
FIG. 10 is a timing diagram illustrating how the eNB may schedule user equipment (UE) resources to avoid collisions with the Wi-Fi beacon.

FIG. 10 is a timing diagram illustrating how the eNB 102 may schedule user equipment (UE) resources to avoid collisions with the Wi-Fi beacon 1055. One 50 ms drxCycle is shown for Long Term Evolution (LTE) uplink 1054 and one 40 ms beacon period (i.e., the beacon interval 1041) is shown for the Wi-Fi beacon 1055. The eNB 102 may receive in-device coexistence interference avoidance (IDC) assistance information from the wireless communication device 104 that includes the beacon duration 937. Because the eNB 102 has a valid value for the beacon duration 937, the eNB 102 may determine 1057 to not schedule user equipment (UE) Long Term Evolution (LTE) uplink 1054 resources for the wireless communication device 104 that would cause the wireless communication device 104 to transmit during subframe 0 of system frame 0. The eNB 102 may also determine 1058 that user equipment (UE) Long Term Evolution (LTE) uplink 1054 resources for the wireless communication device 104 may be scheduled for subframes 1 through 19.

Figure 11:
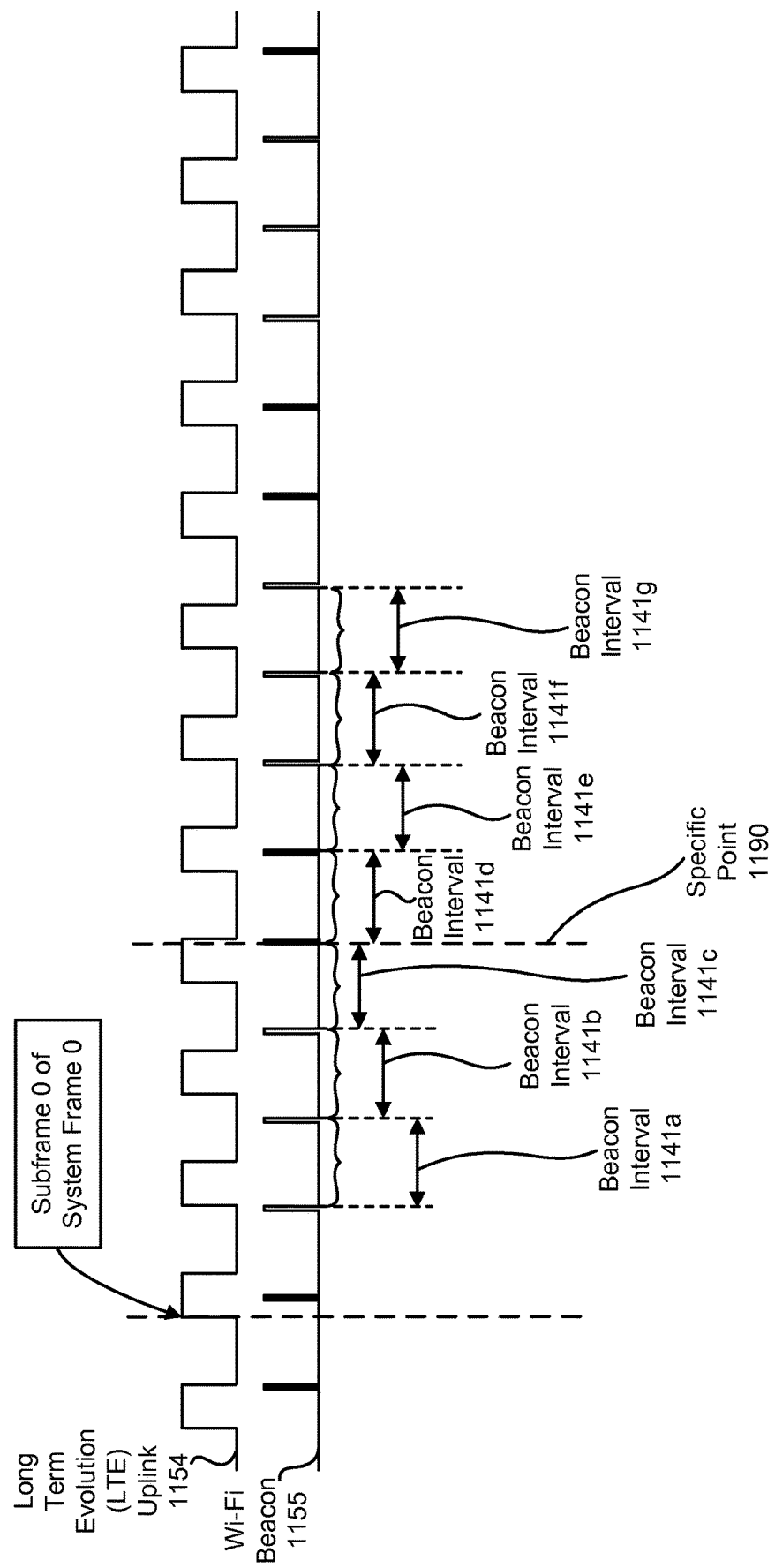
FIG. 11 is a timing diagram illustrating the determination of an initial protocol offset.

FIG. 11 is a timing diagram illustrating the determination of an initial protocol offset 138. Multiple cycles of the Long Term Evolution (LTE) uplink 1154 and the Wi-Fi beacon 1155 are shown. To determine the initial protocol offset 138, the wireless communication device 104 may first ensure that the N (e.g., three) beacon intervals 1141a-c prior to the specific point 1190 have the same value as the Q (e.g., four) beacon intervals 1141d-g subsequent to the specific point 1190. N and Q may be set at the time of manufacture of the wireless communication device 104 and/or later updated as part of the configuration of the wireless communication device 104. The N and Q beacon intervals 141 are required for the wireless communication device 104 to determine the initial protocol offset 138.

Figure 12:
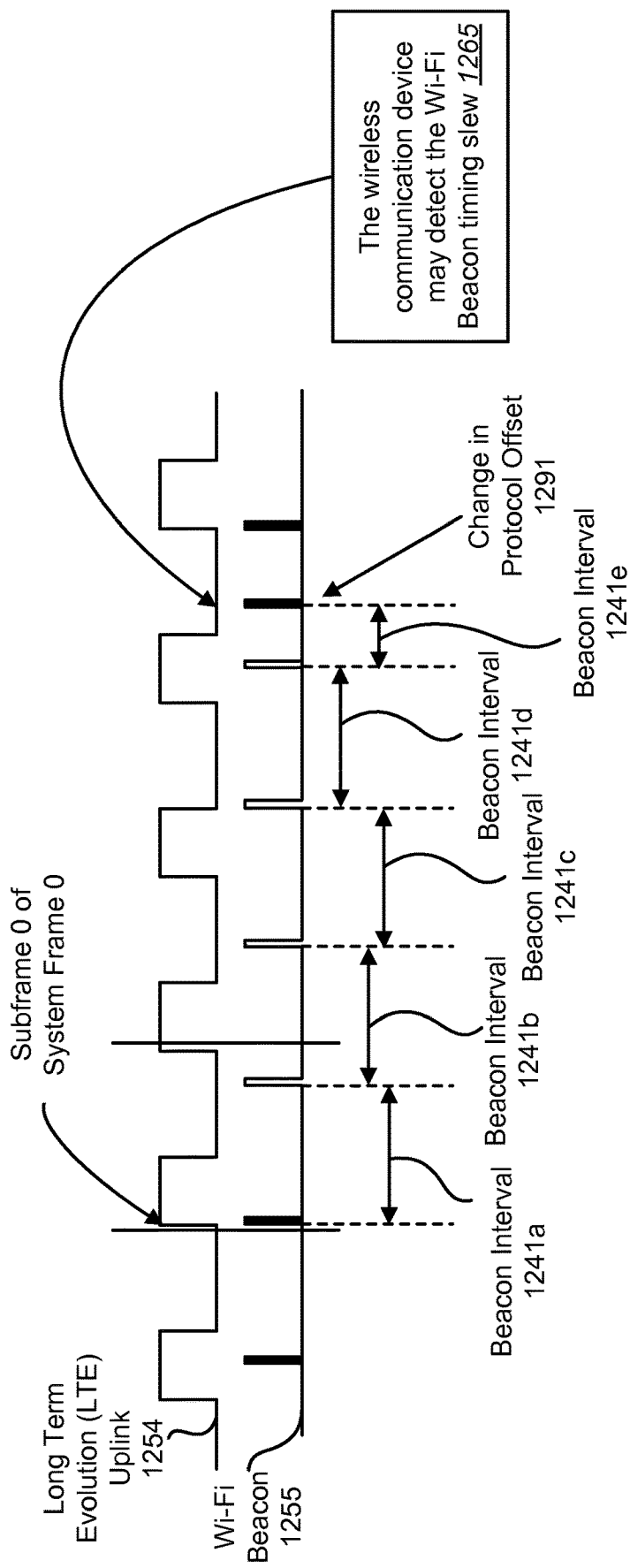
FIG. 12 is a timing diagram illustrating Wi-Fi beacon timing slew.

FIG. 12 is a timing diagram illustrating Wi-Fi beacon timing slew. Multiple cycles of the Long Term Evolution (LTE) uplink 1254 and the Wi-Fi beacon 1255 are shown. As can be seen from the figure, the first four beacon intervals 1241*a-d* are equal but offset from the Long Term Evolution (LTE) uplink 1254 (referred to as deterministic slew). The fifth beacon interval 1241*e* is smaller than the first four beacon intervals 1241*a-d*, resulting in a change 1291 in the protocol offset 138. This beacon slew is non-deterministic. If the wireless communication device 104 detects 1265 the Wi-Fi beacon slew by a change 1291 in the protocol offset 138, the wireless communication device 104 may send an indication to the eNB 102 of this detection. The eNB 102 may then reclassify the recent and near future missing Long Term Evolution (LTE) uplink data as not being caused by radio link failure (RLF), but instead as being caused by the user equipment (UE) autonomous denial (ADN) of the Long Term Evolution (LTE) uplink. Thus, the eNB 102 may not account for the missing Long Term Evolution (LTE) uplink data as an impact to the physical downlink control channel (PDCCH) and physical uplink shared channel (PUSCH) link adaptation.

To handle a non-deterministic beacon, the eNB 102 may allow the wireless communication device 104 to perform autonomous denial (ADN) for the collision between the Long Term Evolution (LTE) uplink 1254 and the Wi-Fi beacon 1255. The wireless communication device 104 may send the autonomous denial (ADN) data 142 to the eNB 102. The autonomous denial (ADN) data 142 may include the number of autonomous denial (ADN) occurrences 143 within a certain period and/or the timing when the autonomous denial (ADN) occurred.

Figure 13:
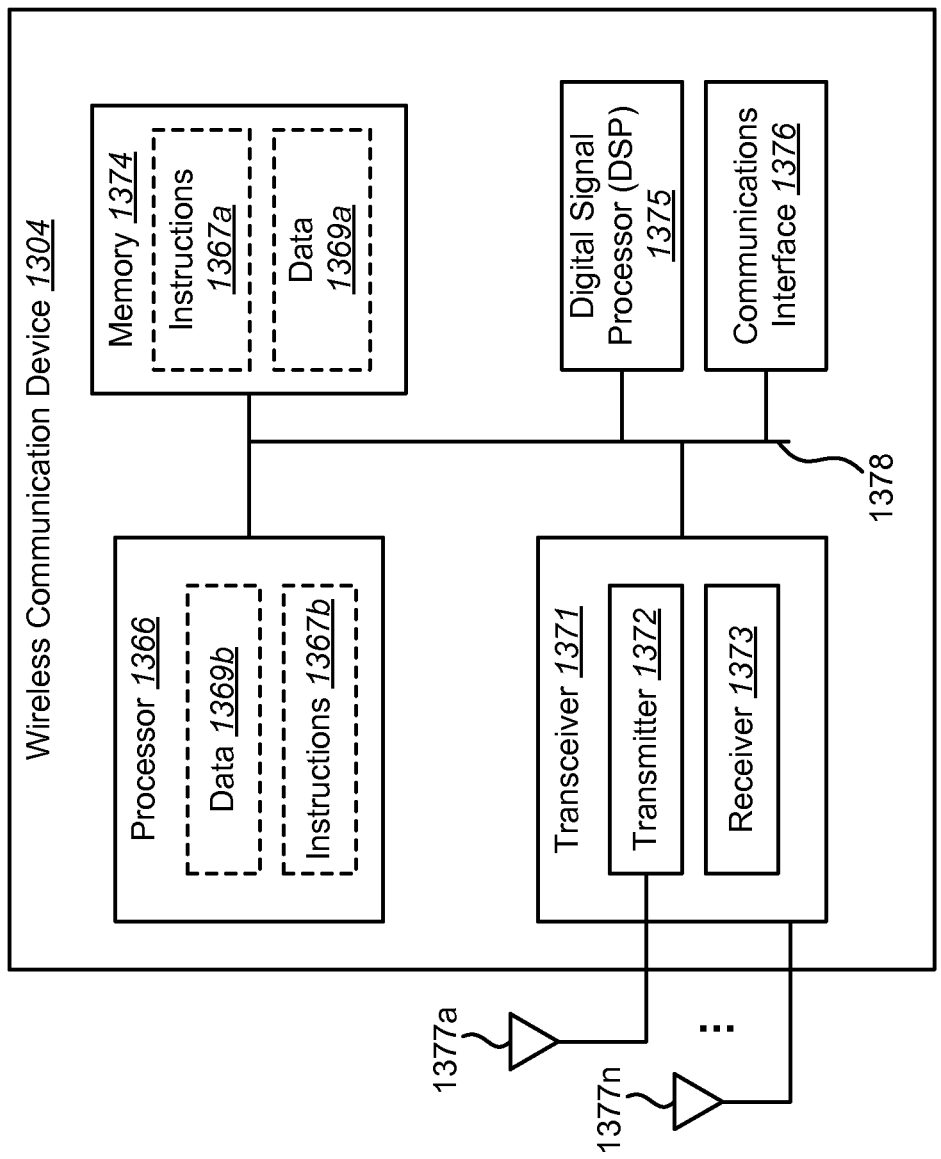
FIG. 13 illustrates various components that may be utilized in a wireless communication device.

FIG. 13 illustrates various components that may be utilized in a wireless communication device 1304. The wireless communication device 1304 may be utilized as the wireless communication device 104 illustrated previously. The wireless communication device 1304 includes a processor 1366 that controls operation of the wireless communication device 1304. The processor 1366 may also be referred to as a CPU. Memory 1374, which may include both read-only memory (ROM), random access memory (RAM) or any type of device that may store information, provides instructions 1367*a* and data 1369*a* to the processor 1366. A portion of the memory 1374 may also include non-volatile random access memory (NVRAM). Instructions 1367*b* and data 1369*b* may also reside in the processor 1366. Instructions 1367*b* and/or data 1369*b* loaded into the processor 1366 may also include instructions 1367*a* and/or data 1369*a* from memory 1374 that were loaded for execution or processing by the processor 1366. The instructions 1367*b* may be executed by the processor 1366 to implement the systems and methods disclosed herein.

The wireless communication device 1304 may also include a housing that contains a transmitter 1372 and a receiver 1373 to allow transmission and reception of data. The transmitter 1372 and receiver 1373 may be combined into a transceiver 1371. One or more antennas 1377*a-n* are attached to the housing and electrically coupled to the transceiver 1371.

The various components of the wireless communication device 1304 are coupled together by a bus system 1378, which may include a power bus, a control signal bus, and a status signal bus, in addition to a data bus. However, for the sake of clarity, the various buses are illustrated in FIG. 13 as the bus system 1378. The wireless communication device 1304 may also include a digital signal processor (DSP) 1375 for use in processing signals. The wireless communication device 1304 may further include a communications interface 1376 that provides user access to the functions of the wireless communication device 1304. The wireless communication device 1304 illustrated in FIG. 13 is a functional block diagram rather than a listing of specific components.

Figure 14:
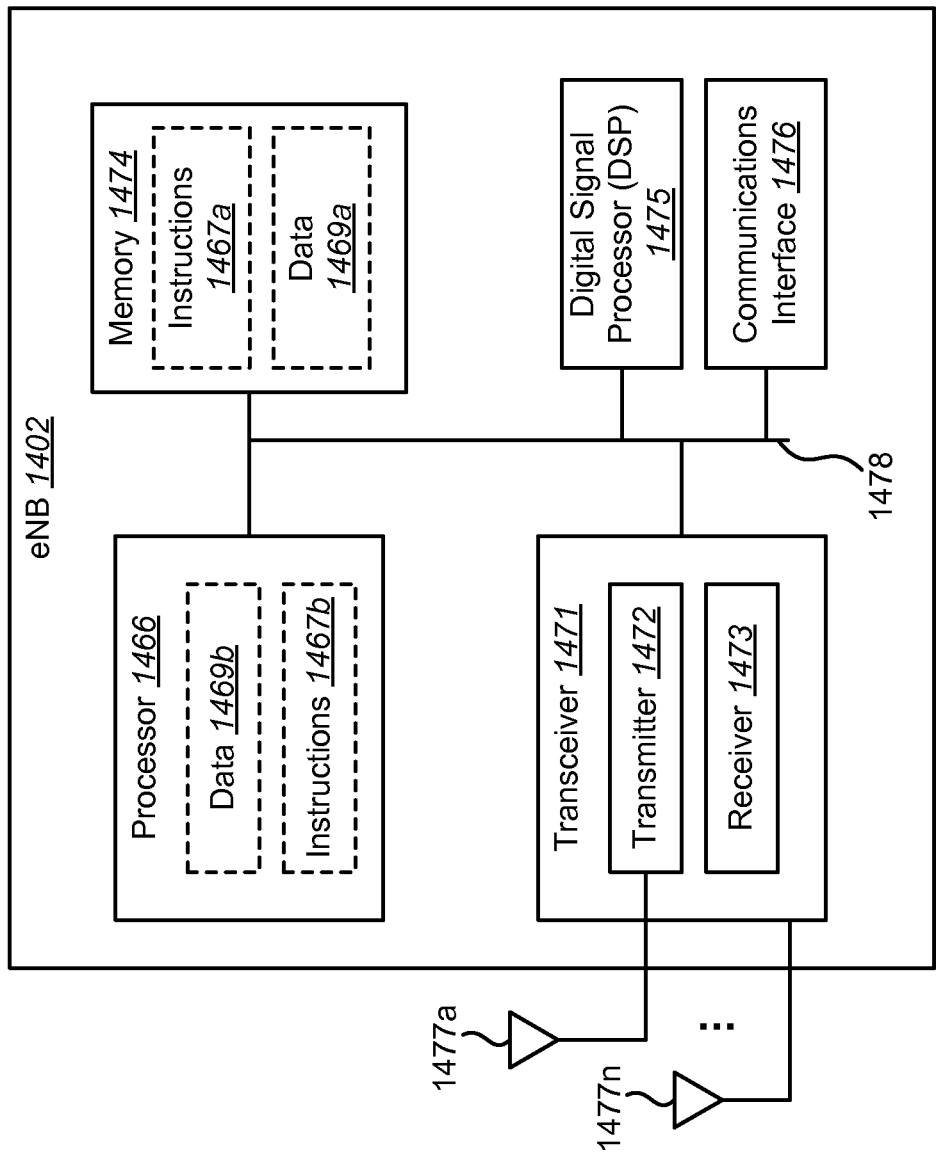
FIG. 14 illustrates various components that may be utilized in an eNB.

FIG. 14 illustrates various components that may be utilized in an eNB 1402. The eNB 1402 may be utilized as the eNB 102 illustrated previously. The eNB 1402 may include components that are similar to the components discussed above in relation to the wireless communication device 1304, including a processor 1466, memory 1474 that provides instructions 1467*a* and data 1469*a* to the processor 1466, instructions 1467*b* and data 1469*b* that may reside in or be loaded into the processor 1466, a housing that contains a transmitter 1472 and a receiver 1473 (which may be combined into a transceiver 1471), one or more antennas 1477*a-n* electrically coupled to the transceiver 1471, a bus system 1478, a DSP 1475 for use in processing signals, a communications interface 1476 and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method used by an Evolved Node B (eNB) for in-device coexistence interference avoidance (IDC), comprising:
transmitting an IDC configuration message to a User Equipment (UE), the IDC configuration message including an indicator; and receiving an IDC assistance information message from the UE, the IDC assistance information message indicating an IDC problem; wherein
receipt, by the UE, of the IDC configuration message to enable transmission of the IDC assistance information message makes it possible for the UE to transmit the IDC assistance information message;
the IDC assistance information message includes at least a timing offset information which represents an offset from a specific point in a Long Term Evolution (LTE) protocol, the specific point being Subframe 0 of System Frame 0;
the timing offset information is used to align an occurrence of LTE DRX inactivity periods with an occurrence of Industrial, Scientific, and Medical (ISM) active periods;
the indicator directly indicates only one of i) transmission of the IDC assistance information message from the UE to the eNB being enabled and ii) the transmission of the IDC assistance information message from the UE to the eNB being disabled; and
the IDC configuration message is transmitted before the IDC assistance information message is received from the UE.

2. The method of claim 1, wherein the timing offset is determined based on a beacon interval of an ISM transceiver.

3. A method used by a User Equipment (UE) for in-device coexistence interference avoidance (IDC), comprising:
receiving an IDC configuration message from an Evolved Node B (eNB), the IDC configuration message including an indicator; and transmitting an IDC assistance information message to the eNB, the IDC assistance information message indicating an IDC problem; wherein
receipt, by the UE, of the IDC configuration message to enable transmission of the IDC assistance information message makes it possible for the UE to transmit the IDC assistance information message;
the IDC assistance information message includes at least a timing offset information which represents an offset from a specific point in a Long Term Evolution (LTE) protocol, the specific point being Subframe 0 of System Frame 0;
the timing offset information is used to align an occurrence of LTE DRX inactivity periods with an occurrence of Industrial, Scientific, and Medical (ISM) active periods;
the indicator directly indicates only one of i) transmission of the IDC assistance information message from the UE to the eNB being enabled and ii) the transmission of the IDC assistance information message from the UE to the eNB being disabled; and
the IDC configuration message is received before the IDC assistance information message is transmitted to the eNB.

4. The method of claim 3, wherein the timing offset is determined based on a beacon interval of an ISM transceiver.

5. An Evolved Node B (eNB) configured for in-device coexistence interference avoidance (IDC), comprising:
a processor;
memory in electronic communication with the processor; and
instructions stored in the memory, the instructions being executable to:
transmit an IDC configuration message to a User Equipment (UE), the IDC configuration message including an indicator; and receive an IDC assistance information message from the UE, the IDC assistance information message indicating an IDC problem; wherein
receipt, by the UE, of the IDC configuration message to enable transmission of the IDC assistance information message makes it possible for the UE to transmit the IDC assistance information message;
the IDC assistance information message includes at least a timing offset information which represents an offset from a specific point in a Long Term Evolution (LTE) protocol, the specific point being Subframe 0 of System Frame 0;

the timing offset information is used to align an occurrence of LTE DRX inactivity periods with an occurrence of Industrial, Scientific, and Medical (ISM) active periods;

the indicator directly indicates only one of i) transmission of the IDC assistance information message from the UE to the eNB being enabled and ii) the transmission of the IDC assistance information message from the UE to the eNB being disabled; and the IDC configuration message is transmitted before the IDC assistance information message is received from the UE.

6. The eNB of claim 5, wherein the timing offset is determined based on a beacon interval of an ISM transceiver.

7. A User Equipment (UE) configured for in-device coexistence interference avoidance (IDC), comprising:

a processor; and memory in electronic communication with the processor;

instructions stored in the memory, the instructions being executable to:

receive an IDC configuration message from an Evolved Node B (eNB), the IDC configuration message including an indicator; transmit an IDC assistance information message to the eNB, the IDC assistance information message indicating an IDC problem; wherein receipt, by the UE, of the IDC configuration message to enable transmission of the IDC assistance information message makes it possible for the UE to transmit the IDC assistance information message;

the IDC assistance information message includes at least a timing offset information which represents an offset from a specific point in a Long Term Evolution (LTE) protocol, the specific point being Subframe 0 of System Frame 0;

the timing offset information is used to align an occurrence of LTE DRX inactivity periods with an occurrence of Industrial, Scientific, and Medical (ISM) active periods;

the indicator directly indicates only one of i) transmission of the IDC assistance information message from the UE to the eNB being enabled and ii) the transmission of the IDC assistance information message from the UE to the eNB being disabled; and the IDC configuration message is received before the IDC assistance information message is transmitted to the eNB.

8. The UE of claim 7, wherein the timing offset is determined based on a beacon interval of an ISM transceiver.

* * * * *